(12) United States Patent
Kokemohr

(10) Patent No.: US 11,023,666 B2
(45) Date of Patent: *Jun. 1, 2021

(54) NARRATIVE-BASED MEDIA ORGANIZING SYSTEM FOR TRANSFORMING AND MERGING GRAPHICAL REPRESENTATIONS OF DIGITAL MEDIA WITHIN A WORK AREA

(71) Applicant: Google LLC, Mountain View, CA (US)

(72) Inventor: Nils Kokemohr, Hamburg (DE)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,945

(22) Filed: Jul. 30, 2019

(65) Prior Publication Data
US 2020/0026751 A1 Jan. 23, 2020

Related U.S. Application Data

(63) Continuation of application No. 15/283,909, filed on Oct. 3, 2016, now Pat. No. 10,372,801, which is a
(Continued)

(51) Int. Cl.
*G06F 40/00* (2020.01)
*G06F 40/169* (2020.01)
*G06F 16/40* (2019.01)
*G06F 16/438* (2019.01)
*G06F 40/106* (2020.01)
*G06F 3/0484* (2013.01)

(52) U.S. Cl.
CPC ........ *G06F 40/169* (2020.01); *G06F 3/04845* (2013.01); *G06F 16/40* (2019.01); *G06F 16/4393* (2019.01); *G06F 40/106* (2020.01)

(58) Field of Classification Search
CPC ...... G06F 40/169; G06F 40/106; G06F 16/40; G06F 16/4393; G06F 3/04845
See application file for complete search history.

(56) References Cited

U.S. PATENT DOCUMENTS

| | | | |
|---|---|---|---|
| 6,456,307 B1 * | 9/2002 | Bates | G06F 3/0481 715/779 |
| 6,976,229 B1 * | 12/2005 | Balabanovic | G11B 27/031 715/838 |

(Continued)

OTHER PUBLICATIONS

Picasa, "Picasa", 2006, Google, Version 2.2, 6 pages/screenshots.*
(Continued)

*Primary Examiner* — Cesar B Paula
*Assistant Examiner* — David Faber
(74) *Attorney, Agent, or Firm* — IP Spring

(57) ABSTRACT

A computer system for a narrational media organizer for transforming digital media into a personal, memorable story with minimal user input having a processor and storage with instructions for creating a narrational media organizer (NMO) environment, where a user can annotate one or more than one digital media file or graphical representations of the digital media files using a user interface; and an NMO data structure for storing the digital media and annotations of the NMO environment.

20 Claims, 27 Drawing Sheets

Related U.S. Application Data continuation of application No. 13/576,918, filed as application No. PCT/US2011/023639 on Feb. 3, 2011, now Pat. No. 9,460,068.

(60) Provisional application No. 61/301,142, filed on Feb. 3, 2010.

(56) References Cited

U.S. PATENT DOCUMENTS

| | | | |
|---|---|---|---|
| 7,016,869 B1 | 3/2006 | Haeberli | |
| 7,454,711 B2* | 11/2008 | Angiulo | G06F 16/958 715/760 |
| 7,614,012 B1* | 11/2009 | Dulaney | G06F 3/04817 715/716 |
| 7,774,431 B2* | 8/2010 | Conn | G06F 16/4393 709/219 |
| 8,380,039 B2* | 2/2013 | Luo | H04N 9/8205 386/224 |
| 8,584,009 B2* | 11/2013 | Ota | G06F 40/117 715/255 |
| 8,612,888 B2 | 12/2013 | Pennigton et al. | |
| 8,656,290 B1* | 2/2014 | Greenspan | G06F 40/197 715/753 |
| 9,460,068 B2* | 10/2016 | Kokemohr | G06F 40/106 |
| 10,372,801 B2* | 8/2019 | Kokemohr | G06F 16/40 |
| 2001/0015762 A1* | 8/2001 | Suzuki | H04N 1/00448 348/333.05 |
| 2003/0013073 A1* | 1/2003 | Duncan | G09B 5/02 434/317 |
| 2004/0105125 A1* | 6/2004 | Ezawa | H04N 5/253 358/1.16 |
| 2004/0201752 A1* | 10/2004 | Parulski | H04N 1/00188 348/231.99 |
| 2004/0255251 A1* | 12/2004 | Vronay | G11B 27/034 715/730 |
| 2005/0243381 A1* | 11/2005 | Hill | H04N 1/0014 358/453 |
| 2006/0004685 A1* | 1/2006 | Pyhalammi | G06F 16/54 |
| 2006/0055808 A1* | 3/2006 | Maeng | H04N 5/772 348/333.11 |
| 2006/0200475 A1* | 9/2006 | Das | G06F 16/58 |
| 2007/0038941 A1* | 2/2007 | Wysocki | G06F 3/0482 715/748 |
| 2007/0186178 A1* | 8/2007 | Schiller | G06F 3/0486 715/769 |
| 2007/0186189 A1* | 8/2007 | Schiller | G06F 16/54 715/838 |
| 2007/0250479 A1* | 10/2007 | Lunt | G06Q 10/10 |
| 2008/0086511 A1* | 4/2008 | Takao | G06F 16/58 |
| 2008/0154747 A1* | 6/2008 | Tarbell | G06Q 30/0643 705/26.62 |
| 2008/0215964 A1* | 9/2008 | Abrams | G06F 40/10 715/246 |
| 2008/0298720 A1* | 12/2008 | Klassen | H04N 1/00307 382/298 |
| 2009/0288009 A1* | 11/2009 | Dulaney | G06F 3/04817 715/719 |
| 2009/0292762 A1* | 11/2009 | Mettala | G06Q 30/02 709/203 |
| 2009/0300475 A1* | 12/2009 | Fink | H04N 21/4781 715/230 |
| 2010/0063961 A1* | 3/2010 | Guiheneuf | G06F 16/58 707/622 |
| 2010/0128919 A1* | 5/2010 | Perronnin | G06F 16/70 382/100 |
| 2010/0174993 A1* | 7/2010 | Pennington | G06F 3/04817 715/738 |
| 2010/0211617 A1* | 8/2010 | Jain | G06F 16/48 707/812 |
| 2010/0274775 A1* | 10/2010 | Fontes | G06F 16/904 707/706 |
| 2011/0313754 A1* | 12/2011 | Bastide | G06Q 10/107 704/2 |
| 2014/0282013 A1* | 9/2014 | Amijee | G06F 3/0482 715/732 |
| 2016/0357420 A1* | 12/2016 | Wilson | G06F 3/04883 |

OTHER PUBLICATIONS

Microsoft, Microsoft Word 2002, Microsoft, 2002, 6 pages.*
Dhakar, "Lightbox JS", 7 pages.
Microsoft, "Micorsoft Excel 2003," Microsoft, copyrighted 2002, SS0-SS6d + 3 pages, 2002, 20 pages.
PICASA, "Picasa," Google Version 2.7, 2007, 6 pages (screenshots).
WIPO, International Search Report for International Patent Application No. PCT/US2011/023639, dated Apr. 5, 2011, 2 pages.
WIPO, Written Opinion for International Patent Application No. PCT/US2011/023639, dated Apr. 5, 2011, 10 pages.
USPTO, First Action Interview, Office Action Summary for U.S. Appl. No. 15/283,909, dated Dec. 14, 2018, 8 pages.
USPTO, Final Office Action for U.S. Appl. No. 13/576,918, dated Jan. 26, 2015, 31 pages.
USPTO, Non-final Office Action for U.S. Appl. No. 13/576,918, dated Jan. 29, 2016, 33 pages.
WIPO, International Preliminary Report on Patentability for International Patent Application No. PCT/US2011/023639, dated Jan. 30, 2012, 51 pages.
USPTO, Notice of Allowance for U.S. Appl. No. 15/283,909, dated Mar. 27, 2019, 16 pages.
USPTO, Notice of Allowance for U.S. Appl. No. 13/576,918, dated May 31, 2016, 20 pages.
USPTO, First Action Interview, Pre-Interview Communication for U.S. Appl. No. 15/283,909, dated Oct. 12, 2018, 5 pages.
USPTO, Non-final Office Action for U.S. Appl. No. 13/576,918, dated Sep. 30, 2014, 34 pages.

* cited by examiner

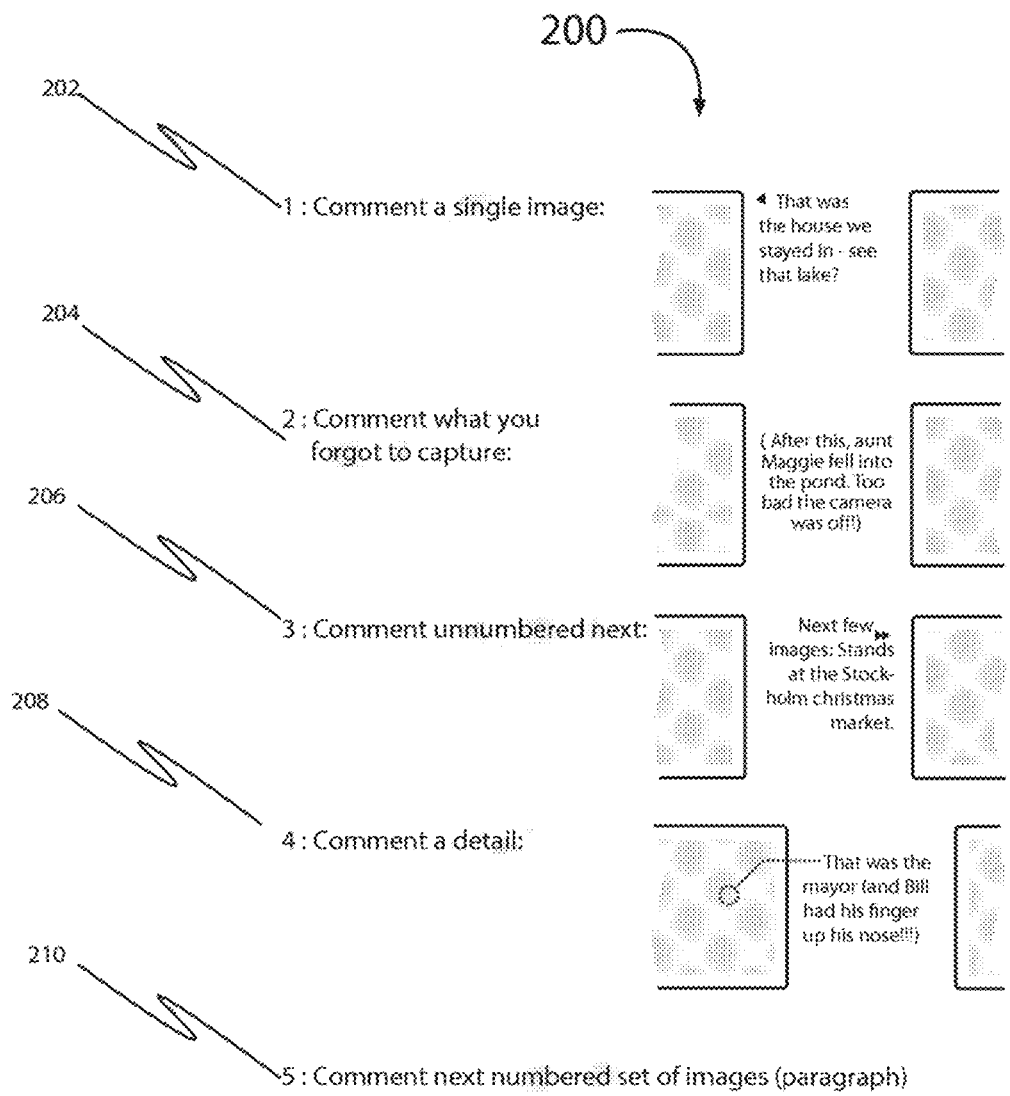
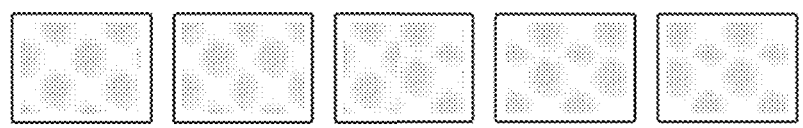
Fig. 2

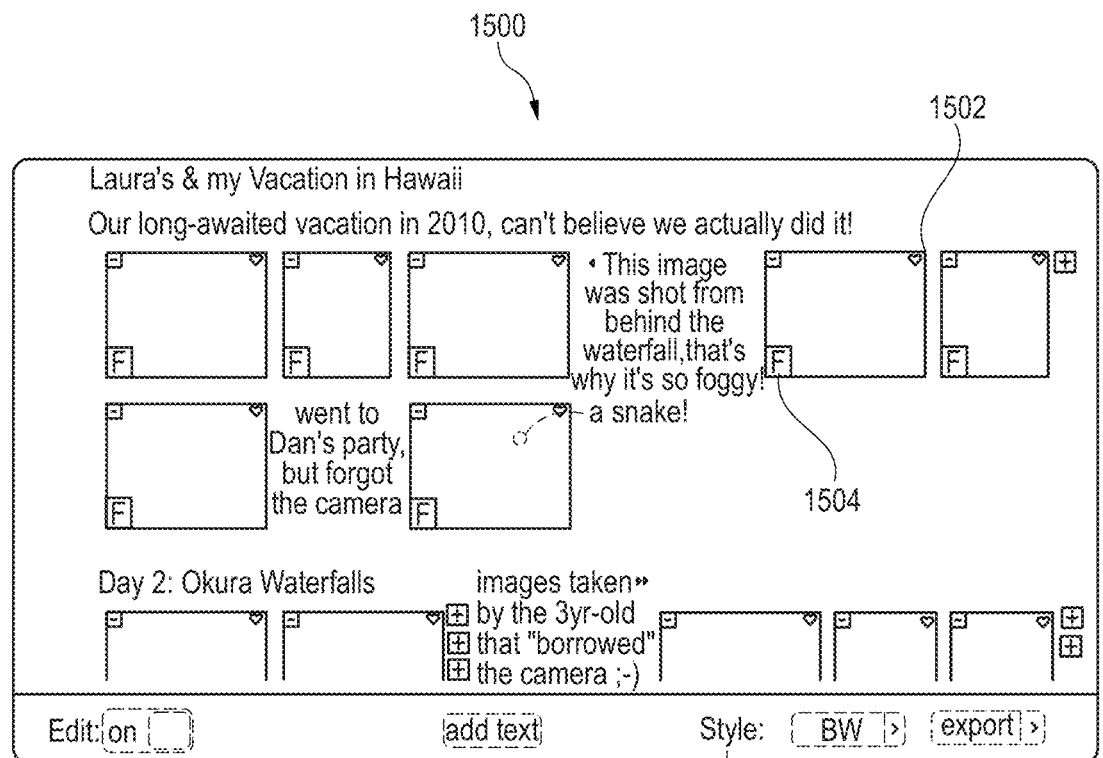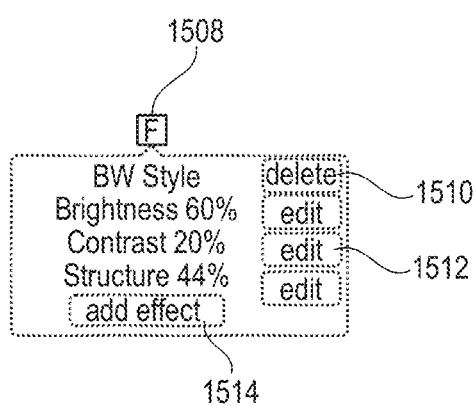
Fig. 15

2308

```
<Story>
  <Header>"Paragraph Headline: Day 1</Header>
  <image> IMG_0025.JPG, unused </image>
  <image> IMG_0026.JPG, unused </image>
  <image> IMG_0027.JPG, used, [xy=180/220], filter=Sepia, </image>
  <cmt> "Comment Text", [xy=190/250] IMG_0025.JPG </cmt>
  ...
</Story>
```

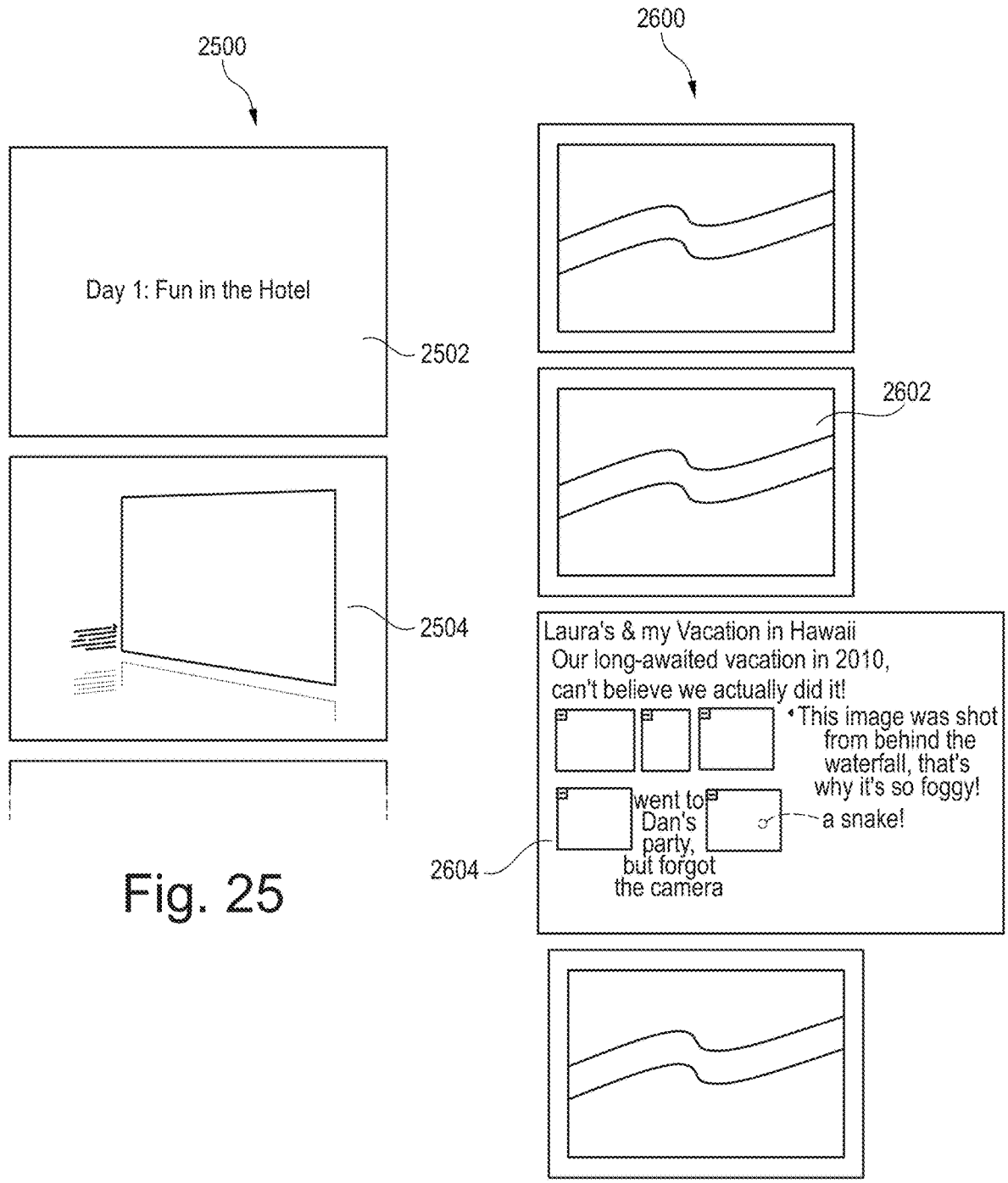

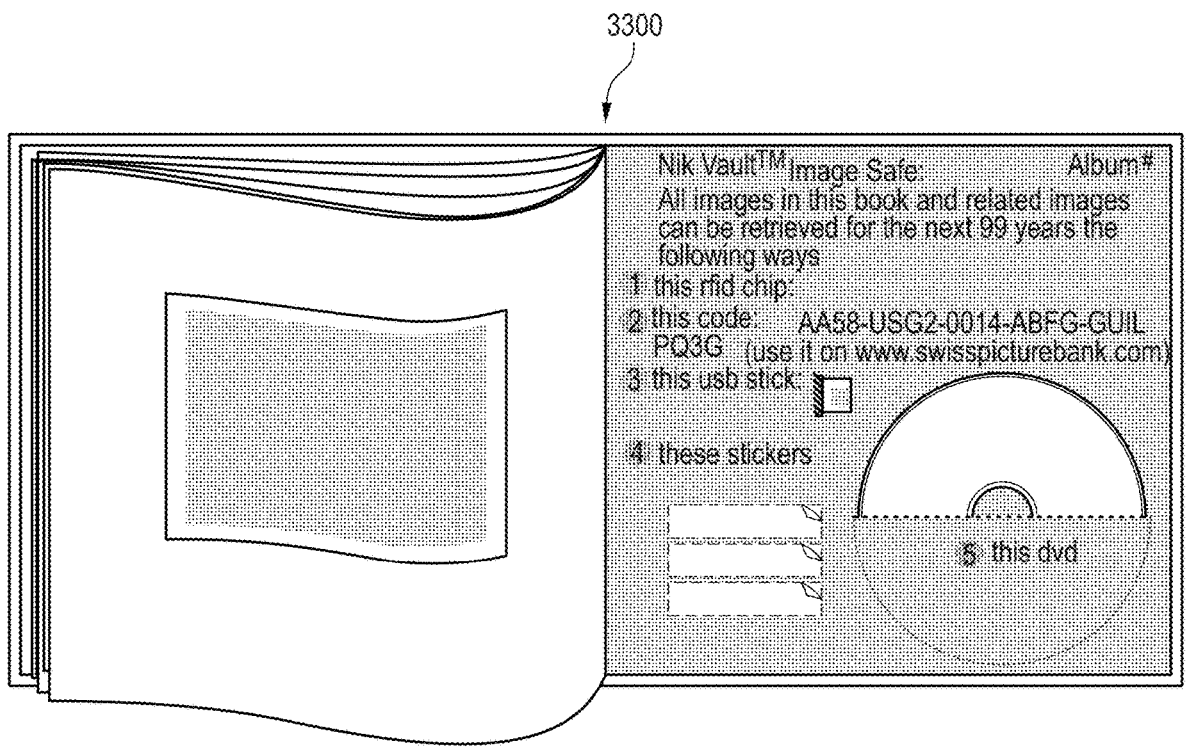
Fig. 33
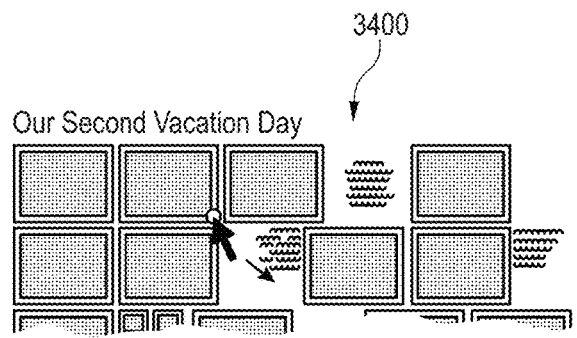
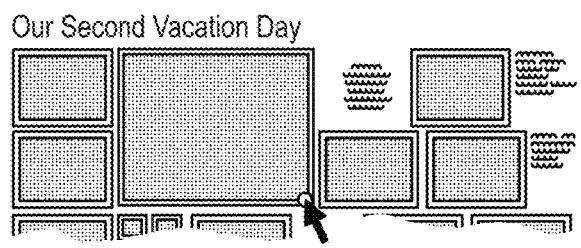
Fig. 34

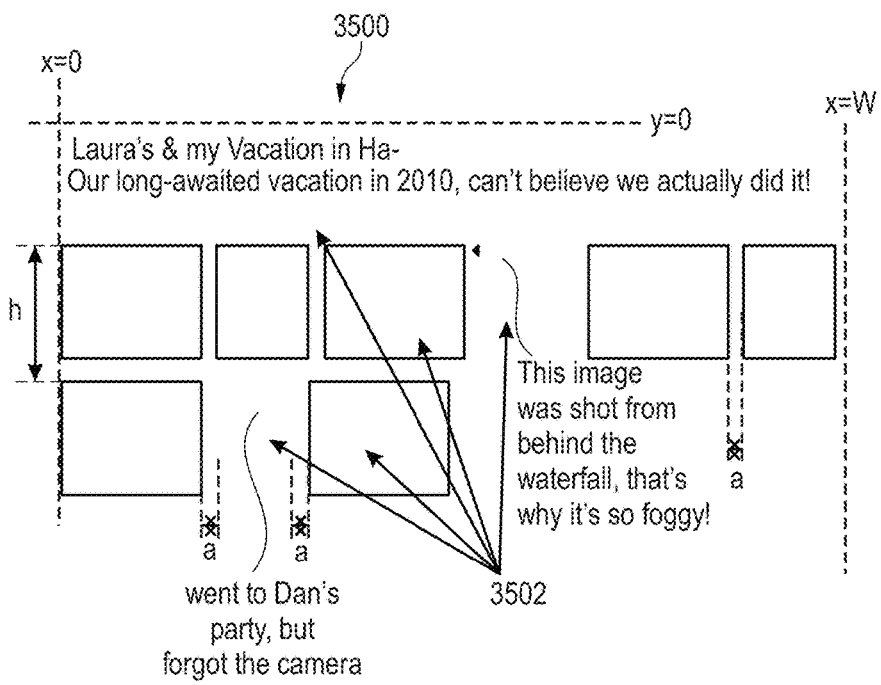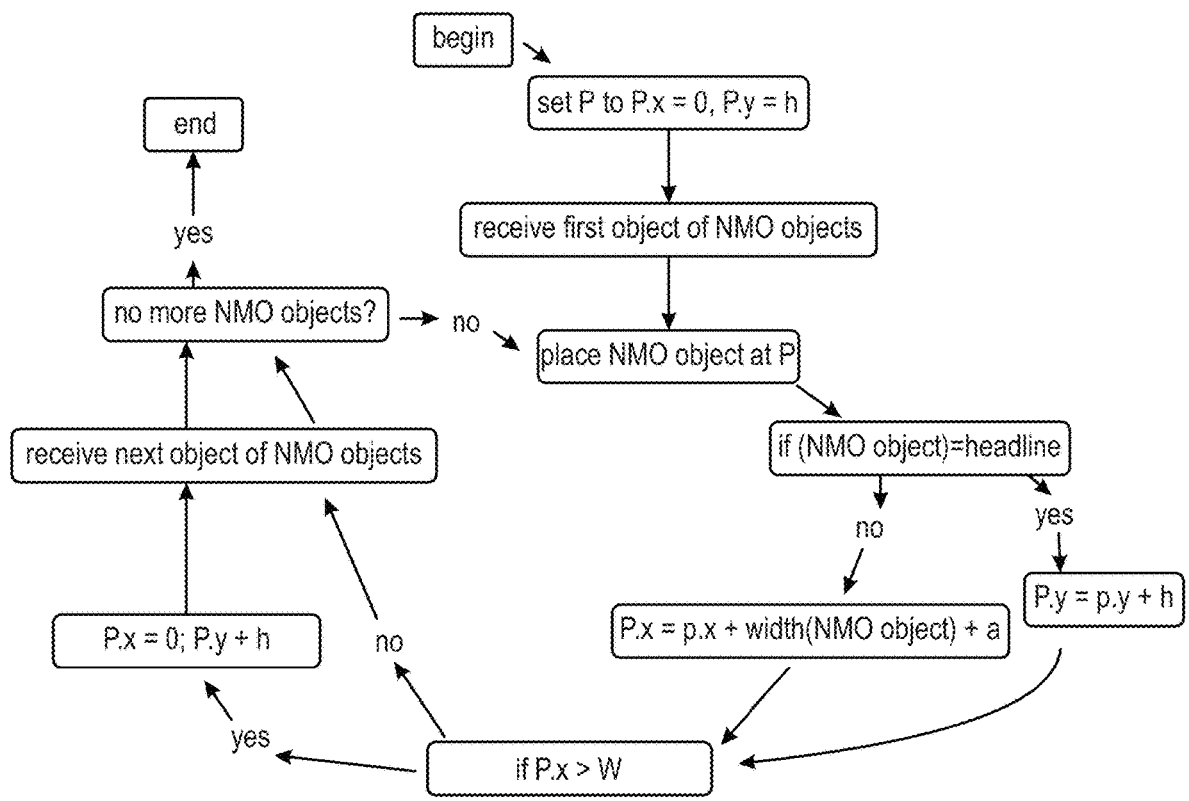
Fig. 35

NARRATIVE-BASED MEDIA ORGANIZING SYSTEM FOR TRANSFORMING AND MERGING GRAPHICAL REPRESENTATIONS OF DIGITAL MEDIA WITHIN A WORK AREA

CROSS-REFERENCE TO RELATED APPLICATIONS

The present application is a continuation of U.S. patent application Ser. No. 15/283,909, filed Oct. 3, 2016 and titled NARRATIVE-BASED MEDIA ORGANIZING SYSTEM FOR TRANSFORMING AND MERGING GRAPHICAL REPRESENTATIONS OF DIGITAL MEDIA WITHIN A WORK AREA, which is a continuation of U.S. patent application Ser. No. 13/576,918, filed Feb. 21, 2013 and titled NARRATIVE-BASED MEDIA ORGANIZING SYSTEM FOR TRANSFORMING AND MERGING GRAPHICAL REPRESENTATIONS OF DIGITAL MEDIA WITHIN A WORK AREA (now U.S. Pat. No. 9,460,068), which is a U.S. national stage entry of International Patent Application No. PCT/US2011/023639, filed Feb. 3, 2011 and titled NARRATIVE-BASED MEDIA ORGANIZING SYSTEM FOR CONVERTING DIGITAL MEDIA INTO PERSONAL STORY, which claims the benefit of U.S. Provisional Patent Application No. 61/301,142, filed Feb. 3, 2010 and titled METHOD AND APPLICATION TO TRANSFORM A SET OF IMAGES INTO A PERSONAL STORY, the contents of all of which are incorporated in this disclosure by reference in their entirety.

FIELD

This present invention is related to digital media manipulation and more specifically to a computer system for a narrational media organizing (NMO) system for transforming digital media into a personal, memorable story with minimal user input.

BACKGROUND

A picture may be worth a thousand words, but without any context, the words portrayed in the picture are meaningless. Current digital media applications allow a user to comment, tag, sort, re-arrange, group and label digital media, such as, for example, Adobe® Photoshop® Elements, flickr.com, Phanfare, Apple® iPhoto®, youtube.com, etc. However, research shows that user satisfaction is low with these applications, because too much user interaction is needed. Rarely do users label and categorize all of their digital media. Further, memories of the events captured in the digital media can become lost due to the inability to quickly and easily document the narrative of the events. For example, Microsoft® Photo Story 3.0, due to its non-narrative user experience, and canned templates for a photo album with some standard digital media editing functionality. Also, applications such as Adobe Bridge, Google Picasa, Apple® iPhoto®, and the embedded digital media and media organization tools in AppleOS® and Microsoft® Windows only allow difficult, time consuming user interaction to personalized the digital media in a meaningful way.

Therefore, there is a need for a system for transforming digital media into a personal, memorable story with minimal user input.

SUMMARY

A computer system for a narrational media organizer for transforming digital media into a personal, memorable story with minimal user input, the system comprising: a) one or more than one processor; b) a machine readable storage connected to the one or more than one processor; c) a set of machine readable instructions stored in the machine readable storage and operable on the one or more than one processor for creating a narrational media organizer environment, where the instructions enable a user to annotate one or more than one digital media file, where the one or more than one digital media files are displayed as graphical representations of each of the digital media files; d) a user interface operably connected to the set of computer instructions for transmitting one or more than one command to the microprocessor; e) an NMO data structure operably connected to the computer instructions and the user interface for storing the digital media and annotations; and f) a storage operably connected to the microprocessor for storing the narrational media organizer environment data structure. The computer instructions further comprises instructions to receive textual annotations from the user and to place a graphical instance of the textual annotations between the graphical representations of the digital media representations; instructions to receive input from the user that construct a paragraph within the NMO environment; instructions to receive input from the user to exclude one or more than one digital media from the NMO environment, thereby making space available for the remainder of the digital media collection. The computer instructions further comprises instructions for cropping one or more than one digital media within the NMO environment and instructions for resealing the digital media preview and to rearrange, if necessary, subsequent digital media in the NMO environment.

In another embodiment, the computer instructions for receiving textual annotations from the user further comprises instructions to receive annotations related to contents of a following numbered or unnumbered series of digital media; instructions to receive a paragraph headline annotation related to the contents of a following section of digital media.

In another embodiment, the computer instructions further comprises instructions to re-included a digital media file in the NMO environment; instructions for excluding the excluded digital media in an NMO output. The computer instructions for receiving textual annotations from the user further comprises instructions to receive annotations that relate to an event that occurred between two digital media, the contents of a single digital media and to one or more than one detail within the digital media.

In one embodiment, the excluded digital media files are represented in a form that requires less display space in the NMO environment. The instructions further comprises instructions for the creation of a paragraph using an input device, a gesture or both an input device and a gesture, thereby, adding space between the digital media in the form of a new paragraph. The creation of a new paragraph also includes adding space in the NMO environment for a headline. The gesture is performed by the user by taking the graphical representation of the digital media with a pointing device and dragging it down.

The computer instructions further comprises instructions to reposition a cursor between the graphical representation of the digital media. The cursor position can be controlled by arrow keys, keyboard key combinations, or by a pointing device, or the return key to create a paragraph, and thereby move the digital media subsequent to the cursor position to be moved down and form a new paragraph. The creation of a new paragraph also includes adding space in the NMO environment for a headline. The user has control over the cursor positioned between digital media, where the position of the cursor can be controlled by the user to add a textual input by the user; where the textual input will trigger instructions to the NMO environment to receive the textual input as an annotation and place it at the position of the cursor.

In another embodiment, the computer instructions further comprises instructions to present a user interface menu option for switching between a first mode and a second mode, where the first mode is suitable to review the digital media collection with the current status of annotations, and the second mode is suitable to receive annotations or digital media exclusion information from the user.

In another embodiment, there is provided a data structure, where the data structure comprises: a) one or more than one fields for storing a list of digital media elements information; b) one or more than one fields for storing annotation information; and c) one or more than one fields for storing paragraph information. The annotation information comprises a data field for storing the type of the annotation, where the data field also comprises a hyperlink field suitable to link the annotation to one or more than one digital media parameters. The digital media parameters are selected from the group comprising a digital media detail, a series of digital media files and a single digital media file. The one or more than one digital media information field comprises actual digital media data, a storage location of the digital media data, or both the actual digital media data and the storage location of the digital media data; a marker to indicate the exclusion of the digital media from the NMO output; a marker to indicate whether or not the digital media will be printed at a larger size in the NMO output. The data structure further comprises a second list of digital media elements where the second list is created when a user triggers the system to output an NMO output. The user can choose between more than one lists related to one digital media collection. The one or more than one list represent different versions of a user narrated story for the digital media collection. The data structure comprises a first list and a second list, where the first list and the second list comprise one or more of the following: a) digital media; and b) a reference to digital media data. The first list is a list of elements pointing to elements in the second list, and where the first or the second list contain information or pointers to information to annotations and information regarding the type of the annotation, the information being suitable to link the annotation to one or more than one of the following: A digital media detail, a series of digital media, a digital media.

In one embodiment there is a system for a narrational media organizer for transforming digital media into a personal, memorable story with minimal user input, the system comprising: a display of digital media and narration as a sequence of icons of digital media and other elements, the display comprising: an algorithm suitable to display all digital media initially at same on-screen height; an algorithm to display comments in-between the digital media; graphical marks to indicate different types of narrational annotations; and vertical spatial inserts between the digital media chosen by the user to indicate that a section or paragraph is to be displayed at this location, leaving room for a paragraph headline at this location. The size of a selection of the displayed digital media can be increased to emphasize the selected digital media. One or more than one of the displayed digital media comprises a flag to emphasize the displayed digital media. The system further comprises means for generating NMO output, where the emphasized digital media are displayed in a larger size; means where the emphasized digital media are displayed on a dedicated page; and means where the emphasized digital media are displayed with an animated presentation.

In one embodiment there is provided a method for a narrational media organizer for transforming digital media into a personal, memorable story with minimal user input, the method comprising the steps of: a) presenting to the user a collection of digital media; b) receiving one or more than one different types of digital media annotations; c) receiving a selection to exclude digital media from the digital media narration; and d) producing graphics that comprise both one or more versions of the digital media and digital media annotations that are suitable to be uploaded or mailed or shared. The presented collection is transformed into smaller resolution versions of the original digital media. The method further comprises the step of uploading, emailing, or both uploading and emailing the smaller resolution versions of the digital media and adding a link to an internet accessible data store comprising the original digital media.

In one embodiment there is provided a method for a narrational media organizer for transforming digital media into a personal, memorable story with minimal user input, the method comprising the steps of: a) providing a user menu where the user can choose from a list of NMO outputs; b) providing at least one algorithm suitable to interpret a data structure representing digital media and one or more than one annotation type and suitable to generate at one or more than one NMO outputs based on the same data structure; and c) outputting the NMO data structure to a physical format, a virtual format, or both a physical and virtual format. The NMO output is selected from the group comprising a slideshow, a web page, a video representing a slide show, a PDF, a photo book, or a printed photo collection, and an email with contents of text and digital media suitable to represent the story created in the NMO environment. The method further comprises the step of applying a graphical style to the digital media, where the style can change parameters of the displayed digital media. The style can comprise one or more than one of the following: a) a digital media filter to the digital media; b) a background graphic behind the digital media; c) a text style of the textual annotations; d) a spatial arrangement; and e) a layout style of the digital media and annotations. The style can be applied to a selection of the digital media, to a paragraph of the digital media, or to all of the digital media. The method further comprises the step of outputting the NMO environment with the applied style.

In one embodiment there is provided a method for a narrational media organizer for transforming digital media into a personal, memorable story with minimal user input, the method comprising the steps of: a) generating an NMO output; b) uploading the NMO output to a publicly accessible digital storage; c) uploading the NMO output to a web community.

In one embodiment there is a system for a narrational media organizer for transforming digital media into a personal, memorable story with minimal user input, the system comprising: a) means for generating an NMO output; b) means for uploading the NMO output to a publicly accessible digital storage; and c) means for uploading a hyperlink to the NMO output to a web community. The hyperlink further comprises a title for a story created in the NMO environment. The NMO output further comprises an icon representing the story, and a hyperlink from the web community to the publicly accessible digital storage. The method further comprises the step of non-destructive exclusion of one or more than one of the digital media, where the step of non-destructive exclusion is performed by clicking on an icon superimposed on each of the digital media, thereby minimizing the digital media and where the minimized digital media can be represented by a smaller version of the digital media. The minimized digital media can be represented by an icon that is displayed at the location of the digital media. The step of non-destructive exclusion is performed by initially displaying the digital media on a side bar, top bar or gutter, and then selecting and positioning each selected digital media on a large space suitable to receive and arrange the selected digital media and annotations. The step of non-destructive exclusion is performed by initially displaying the digital media in a sequence and providing a side bar, top bar or gutter where the user can move the digital media to be excluded from the narration.

In one embodiment, there is provided a method for a narrational media organizer for transforming digital media into a personal, memorable story with minimal user input, the method comprising the steps of: a) combining two or more different digital media collections of one or more than one event from two or more contributing users; b) providing an algorithm suitable to combine the different digital media collections into a single NMO environment; c) editing the single NMO environment by two or more users; and d) outputting a single NMO output to the two or more users. The combined data collection comprises at least two different annotation types. The excluded digital media in one of the two or more different digital media collections are not combined in the single NMO environment. The method further comprises the step of granting permissions to a non-contributing user that did not provide any of the digital media, where the non-contributing user can add annotations to the digital NMO environment, and where the contributing users can add the non-contributing user's annotations into each of the two or more different digital media collections.

In one embodiment, there is provided a method for a narrational media organizer for transforming digital media into a personal, memorable story with minimal user input, the method comprising the steps of: a) providing a standard NMO environment; b) providing a preview NMO environment; c) non-destructively excluding digital media from the NMO environment; d) including at least two different annotation types; e) automatically creating an NMO output; f) providing a preview to a user of the NMO output on a display within a preview NMO environment; g) editing annotations within the NMO output preview on the display; h) updating the NMO output preview; i) updating the NMO data structure; j) updating the displayed contents in the NMO environment; k) outputting from the NMO environment; and l) providing an output creation algorithm for outputting data stored in the NMO environment. The algorithm is operable to transform the NMO output to a hardcopy format of the NMO environment; to output to a digital copy of the hardcopy, where the digital copy can be accessed and previewed using the Internet. The digital copy can be ordered as a hardcopy of the NMO output.

In one embodiment, there is provided a method for a narrational media organizer for transforming digital media into a personal, memorable story with minimal user input, the method comprising the steps of: a) creating an NMO output; b) providing an NMO output creation algorithm, where the algorithm is operable to output a hardcopy of an NMO output, a digital copy of the NMO output, or both a hardcopy and a digital copy of the NMO output; c) uploading the digital copy to a web community or a public forum; and d) providing a means for ordering a hardcopy of the NMO output hardcopy.

In one embodiment, there is provided a method for a narrational media organizer for transforming digital media into a personal, memorable story with minimal user input, the method comprising the steps of: a) providing one or more than one digital media files; b) adding annotations to the one or more than one digital media files; c) non-destructively excluding one or more than one of the digital media files from being output within an NMO environment; d) providing an algorithm suitable to produce a hardcopy of the NMO environment; and e) providing an algorithm suitable to produce a virtual copy of the NMO environment. The method further comprises the steps of providing a selector of at least two different NMO output types and providing access to the virtual copy of the NMO environment. The hardcopy is selected from the group consisting of a printed journal, a photo book, a calendar, a series of printed digital media with or without annotations, a scrapbook and a family history. The access to the virtual copy of the NMO environment comprises a physical data storage including data of digital media not included in the NMO output, a code, a web link, a password to access a website, an authentication code suitable to authenticate the owner of the NMO output hardcopy to retain the digital media data from a manufacturer of an NMO output hardcopy, from the provider of the NMO environment software, or from a third trusted company.

In one embodiment, there is provided a computer system for a narrational media organizer for transforming digital media into a personal, memorable story with minimal user input, the system comprising: a) one or more than one processor; b) a machine readable storage connected to the one or more than one processor; c) a set of machine readable instructions stored in the machine readable storage and operable on the one or more than one processor for creating a narrational media organizer environment, where the instructions enable a user to annotate one or more than one digital media file, where the one or more than one digital media files are displayed as graphical representations of each of the digital media files; d) a user interface operably connected to the set of computer instructions for transmitting one or more than one command to the microprocessor; e) an NMO data structure operably connected to the computer instructions and the user interface for storing the digital media and annotations; f) a storage operably connected to the microprocessor for storing the narrational media organizer environment data structure; and g) a non-transitory computer readable medium with instructions that, when executed by one or more computers, cause the one or more computers to perform operations. The computer instructions further comprises instructions for displaying a selection of the narrational media organizer on a graphical representation of the one or more than one digital media to non-destructively excluded digital media; and instructions for displaying a selection of the narrational media organizer on a graphical representation of the one or more than one digital media to re-include previously excluded digital media. The re-included digital media is restored to a full graphical representation of the digital media. The computer instructions further comprises instructions for displaying a selection of the narrational media organizer on a graphical representation of the one or more than one digital media to destructively exclude the digital media.

In one embodiment, there is provided a method for a narrational media organizer for transforming digital media into a personal, memorable story with minimal user input, the method comprising the steps of: a) providing a standard NMO environment; b) providing a preview NMO environment; c) non-destructively excluding digital media from the NMO environment; d) including at least two different annotation types; e) automatically creating an NMO output; and f) providing a preview to a user of the NMO output on a display within a preview NMO environment.

In one embodiment, there is provided a method for a narrational media organizer for transforming digital media into a personal, memorable story with minimal user input, the method comprising the steps of: a) editing annotations within the NMO output preview on the display; b) updating the NMO output preview; c) updating the NMO data structure; d) updating the displayed contents in the NMO environment; e) outputting from the NMO environment; and f) providing an output creation algorithm for outputting data stored in the NMO environment.

BRIEF DESCRIPTION OF THE DRAWINGS

These and other features, aspects, and advantages of the present invention will become better understood with reference to the following description, illustrations, equations, appended claims, and accompanying drawings where:

FIG. 2 is a diagram of five comment types useful in the system of FIG. 1;

FIG. 15 is a diagram that illustrates a selector that allows the user to apply a style to the digital media collection;

FIG. 25 is a diagram of a slideshow output from the systems of FIG. 1, FIG. 3, FIG. 23 or FIG. 24;

FIG. 26 is a diagram of a printed picture output from the systems of FIG. 1, FIG. 3, FIG. 23 or FIG. 24;

FIG. 33 is a diagram of a printed output from the systems of FIG. 1, FIG. 3, FIG. 23, FIG. 24 or FIG. 32;

FIG. 34 is a diagram of a user interaction where a user can emphasize a particular image by resizing the image;

FIG. 35 is a diagram and a flowchart of an algorithm for flagging a single digital media in the NMO environment according to one embodiment of the present invention;

DETAILED DESCRIPTION

Figure 1:
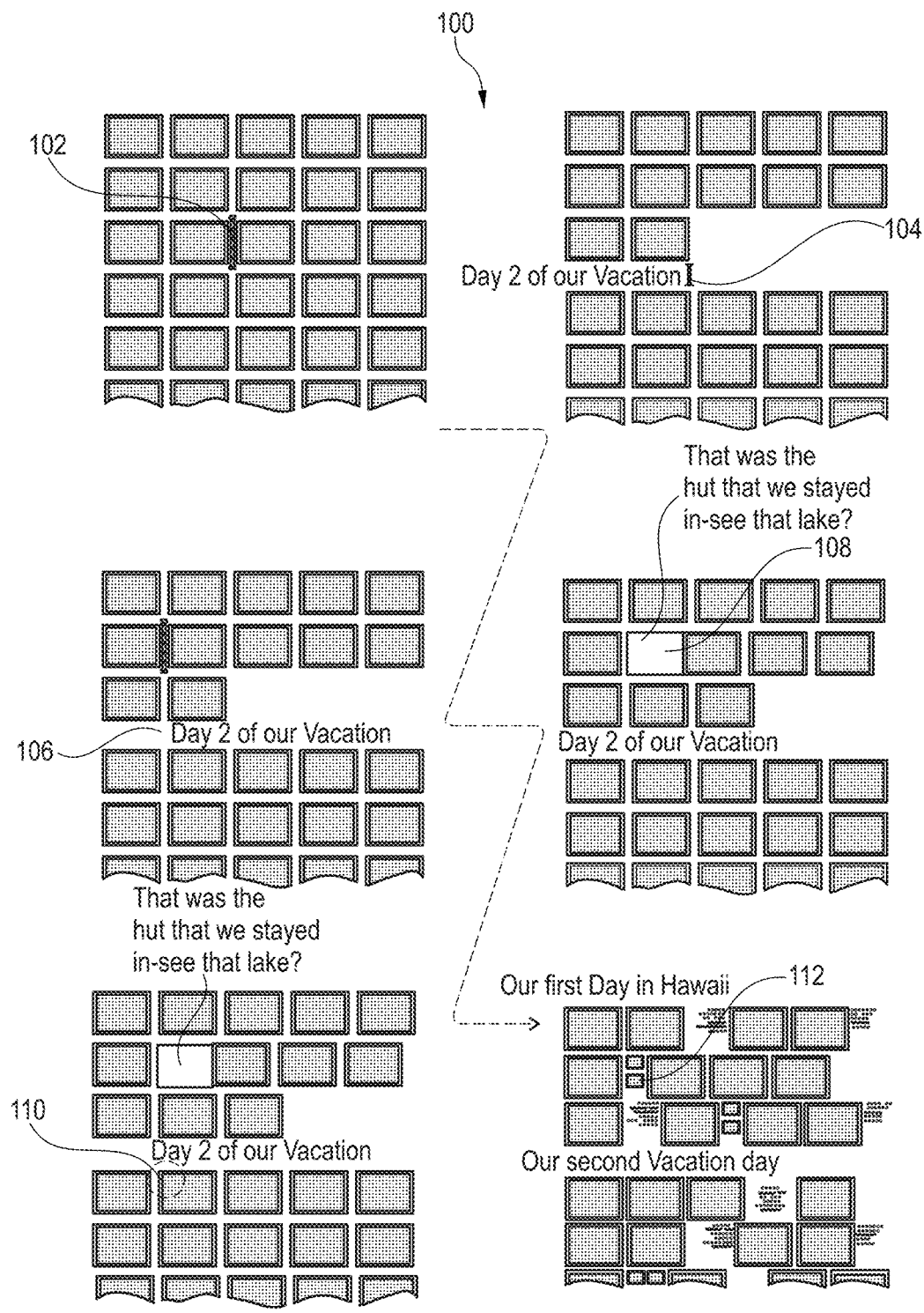
FIG. 1 is a workflow diagram of a narrational media organizing system for transforming digital media into a personal, memorable story with minimal user input according to one embodiment of the present invention.

The present invention overcomes the deficiencies in the current art by providing a system that transforms digital media into a story that reflects the memories the user wants to be associated with the digital media with maximum structure and minimal user input. The system provides the ability such that every digital media does not need to be commented/treated by the user in order to add structure to the digital media. Comments can be per digital media file, per detail and per a series of digital media, or by any combination of digital media file, detail and series. Digital media can be structured using paragraphs, as opposed to groups, tags or folders in a similar fashion to a word processor. The system provides a method for the user to structure and store the digital media in the same categories that the user would mentally categorize the digital media allowing for a more natural workflow. Additionally, the system can transform the results into a variety of formats, such as blogs, web galleries, scrap books, family histories or photo books with narrative content, with little or no additional user input.

Methods, systems and devices that implement the embodiments of various features of the system will now be described with reference to the drawings. The drawings and the associated descriptions are provided to illustrate embodiments of the system and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments can be practiced without these specific detail. Well-known circuits, structures and techniques may not be shown in detail in order not to obscure the embodiments. For example, circuits can be shown in block diagrams in order not to obscure the embodiments in unnecessary detail.

Also, it is noted that the embodiments can be described as a process that is depicted as a flowchart, a flow diagram, a structure diagram, or a block diagram. Although a flowchart can describe the operations as a sequential process, many of the operations can be performed in parallel or concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, a storage can represent one or more devices for storing data, including read-only memory (ROM), random access memory (RAM), magnetic disk storage mediums, optical storage mediums, flash memory devices and/or other machine readable mediums for storing information.

Furthermore, embodiments can be implemented by hardware, software, firmware, middleware, microcode, or a combination thereof. When implemented in software, firmware, middleware or microcode, the program code or code segments to perform the necessary tasks can be stored in a machine-readable medium such as a storage medium or other storage(s). A processor can perform the necessary tasks. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

In the following description, certain terminology is used to describe certain features of one or more embodiments of the invention.

The term "machine readable medium" includes, but is not limited to portable or fixed storage devices, optical storage devices, wireless channels and various other mediums capable of storing, containing or carrying instruction(s) and/or data.

The term "narrational" refers to the act or process of writing or the telling of a story or of happenings or a descriptive account.

The term "pointing device" refers to any device capable of interfacing with a computing device, such as, for example, a finger, a mouse, a stylus, a track pad among others.

The term "gesture" refers to moving the pointing device is a specified manner such that the motion is translated into a command that the computing device is capable of processing.

The term "digital media" refers to one or more than one digital photographs, digital movies or digital audio data files.

The term "graphical representation" refers to a preview, icon or thumbnail of a photograph, video footage, a composed digital media, RAW data, audio file or other media file.

The term "commentary" refers to a record of events usually written by a participant, usually a few sentences long, that establishes a summary for and expresses the relevance of each source.

The term "annotation type" refers to different types of interactive commentary, explanatory note or body of notes and descriptions useful to the user in constructing a story from the digital media.

The term "NMO environment" refers to operations that a user can perform on a set of digital media, such as, for example, adding annotations, minimizing the digital media, editing the digital media, choosing styles, adding paragraphs and adding headlines. These operations are typically non-destructive actions on the digital media, creating a data structure that transforms the digital media into an event narration or a story.

The term "NMO output" refers to a printed or virtual document that is created based on the digital media of a user and based on the user input received from an NMO environment that represents the user's narration to a broader audience, such as, for example, a picture story in an email, a series of printed digital media with storytelling elements inserted, a slideshow, a web blog, a link on a social community site to a storytelling website, a printed photo album with text elements, a calendar with narrative contents, a video with slideshow-like contents among others.

The term "comment" or "annotation" refer to text that the user provides (in written, typed, scribbled, scanned or spoken and then recorded form) to describe the digital media.

The term "headline" refers to a heading for a particular set or subset of the digital media that the user is annotating. The headline text, possibly in a large size, serves as a title and/or descriptor for the following digital media series.

The term "paragraph" refers to the result of the process of adding a space (on the display medium or the print medium) between the sets of digital media, thereby visually creating another section of digital media that is visually separated to form a new unit by said space, and possible creating space for a headline.

The terms "hiding", "shrinking" and "excluding" refer to a user action performed on a specific representation of a digital media file in the NMO environment to indicate that the digital media is only included in the NMO environment, not in the NMO output.

The terms "bringing back", "unshrinking", "unhiding" and "re-including" refer to the opposite action of "hiding", "shrinking" and "excluding" where the user gestures on a digital media representation in the NMO environment that was hidden/shrunk/excluded and thereby assigns a normal status to the digital media, indicating that the digital media is to be included in NMO output again.

The Narrational Approach

The narrational media organizing (NMO) system is used to convert digital media of a general topic, such as, for example, a vacation, a wedding, a weekend, and a party etc. to tell a story. The story captured in the digital media is not complete. There are missing elements from the story that can be filled in by people that attended the event. As previously stated, current digital media sorting software does not provide a simple way to turn digital media into a story. The user could use available presentation software, layout software, etc., but only with a great deal of time and input from the user. Using the NMO system requires very little user input to transform digital media into a story. Additionally, using the NMO system can be a fun experience for the user, because structure is added to the digital media very quickly after the user begins working with NMO, resulting in a quick results for very little effort.

One key aspect of this invention is that the user flow follows to a great extent the narrational intent of the user. The user interaction is designed to allow commenting and storytelling that is associated with the digital media. In some instances, the user can add additional elements to the story that were not captured in a digital media file or other type of recording. The user is freed from the per-image-commenting requirement of the currently available software.

Referring now to FIG. 1, there is shown a workflow diagram of a narrational media organizing (NMO) system 100 for transforming digital media into a personal, memorable story with minimal user input according to one embodiment of the present invention. As can be seen, the system 100 display a digital media collection as it can appear in a user's operating system or at any typical location where the user first encounters the digital media once downloaded from a camera, video recorder or an audio recording device.

In one embodiment, a text cursor 102 is used to indicate where a new comment can be placed amongst the digital media collection in an NMO environment. A paragraph 104 can be formed when the user presses a return key or when the appropriate gesture is performed. The paragraph 104 moves the subsequent digital media below the proceeding digital media. A headline 106 can be optionally entered in the space created by the paragraph. The headline 106 can relate to all the digital media that follow the paragraph 104 until the end, or between the headline 106 and the next headline. The headline 106 is also referred to as a type 5 comment.

In one embodiment, the user can place the text cursor 102 in between any of the digital media in the NMO environment. Once the cursor 102 has been located where the user desires to make a comment 108, the user can add the comment 108 quickly and easily. If the user does not want a particular digital media to be included in the story or in the output of the story, the user can click or tap on an icon 110 that will non-destructively delete the digital media from the NMO environment. As can be seen in this embodiment, the graphical representation of the digital media is replaced with a smaller icon 112. The remaining digital media is then rearranged so that the display of the remaining digital media is maximized.

The NMO system 100 can be used to quickly add as many comments as a user desires by filling in the blanks between the digital media until the story is told using only the digital media that completes the story without deleting any of the digital media. For example, the final diagram of the system 100 shows a possible result where thirty-two digital media have been organized using two headlines, seven comments, and six digital media have been minimized (hidden).

In one embodiment, the digital media collection can be arranged in a work area in one or more rows and one or more columns. The user can place NMO cursor 102 in between the first media instance and the second media instance.

The NMO cursor 102 can be moved between one or more graphical representations along the current row, up and down or to the next or preceding instance. The user can move the NMO cursor 102 with a variety of input devices, such as, for example, a keyboard cursor keys, a mouse, a pen tablet, a finger etc. The NMO cursor 102 is typically placed between graphical representations.

In one embodiment, the NMO system comprises a computer system for transforming digital media into a personal, memorable story with minimal user input. The system can comprise: one or more than one processor; a machine readable storage connected to the one or more than one processor; a set of machine readable instructions stored in the machine readable storage and operable on the one or more than one processor for creating a narrational media organizer environment, where the instructions enable a user to annotate one or more than one digital media file, where the one or more than one digital media files are displayed as graphical representations of each of the digital media files; a user interface operably connected to the set of computer instructions for transmitting one or more than one command to the microprocessor; an NMO data structure operably connected to the computer instructions and the user interface for storing the digital media and annotations; and a storage operably connected to the microprocessor for storing the narrational media organizer environment data structure.

An NMO comment can be added by placing a cursor between digital media 102 and adding text 108, just like adding some text into an existing text document. Similar to some text editors, the user can place the cursor between digital media 102 and then hit return, thereby creating a new paragraph 104. Like in a text editor, the digital media are split up into a new paragraph, best shown by the attached illustrations, and in a preferred embodiment the software can automatically create an empty space for a headline (the headline would be preferably bigger than other text) or maybe a space for the headline and some additional space for a standard text size sub caption for that headline.

Summarizing, the interaction of positioning cursor—writing text—hitting return would create a per-digital media comment, while the interaction of positioning cursor—hitting return—writing text would create a paragraph.

Referring now to FIG. 2, there is shown a diagram of five comment types 200 useful in the system of FIG. 1. As can be seen, graphical implementations 202, 204, 206, 208 and 210 of the five comment types 200 are shown according to one embodiment. A type 1 comment 202 is used for a single digital media annotation. A type 2 comment 204 can be used for an annotation that is loosely associated with the timely moment of some digital media, but not with specific digital media, or that is associated with a specific moment that took place between digital media. A type 3 comment 206 can be used for an annotation that relates to unnumbered subsequent digital media, hence featuring a double-arrow. The type 3 comment 206 can also be left-aligned to be associated with unnumbered preceding digital media. A type 4 comment 208 can be used to show a digital media detail comment. A digital media detail comment is used to highlight a portion of the digital media rather than the entire digital media. A type 5 comment 210 is used to show a paragraph comment, preferably in a design that makes the type 5 comment 210 stand out more than the preceding ones. Although these five comment types are used throughout this disclosure it is understood that there are many other possible comment types and that the present invention is not limited to these five types.

With respect to this invention, comment types 1, 2, 3 and 4 refer to in-between-media-instance comments, per-digital media or per-media-instance comments, per-detail comments or per-unnumbered-digital media-series comments respectively. Comment type 5 typically refers to a headline 106 that describes all subsequent digital media between this headline and the end of the document or the subsequent headline.

In one embodiment, when the user starts to type in the NMO system 100, text will appear between the graphical representations, pushing, if necessary, subsequent graphical representations away to generate space for text to be entered. This pushing away of media instance can result in a media instance being moved to a subsequent row of digital media. The typed text can be assigned to be one of four types by the user:

1 text in between the graphical representations;
2 text in between graphical representations, but assigned to the preceding media instance;
3 text in between graphical representations, but assigned to the subsequent graphical representations (plural); or
4 text associated to a detail in a media instance.

Using the type 1 comment, the text can be made as a general annotation between media instance, or, particularly, the text can represent a media instance that was not taken at a given time. For example, the user has taken digital media of the beautiful scenery when a funny incident occurs to a friend nearby. The user not being fast enough has taken a picture of the funny aftermath of the incident, but not of the incident itself. To comprehend the nature of the picture taken after the incident (particularly years later), the incident itself should have been captured, but wasn't. In that case, the user can use the NMO cursor 102 to enter text between the digital media that complete the story. A typical annotation of type 1 would be "Now we visited the national history museum, but we weren't allowed to use our camera there" or "here aunt Maggie fell into the pond, too bad I didn't have my camera on."

In the case of the type 2 comment, the user can type in text between graphical representations, but the text can be left-aligned and have a little triangle/arrow optically associating the text to the preceding digital media (to the left of the entered text). In this instance, the text is equivalent to a single digital media annotation, as is known in the current art from other digital media or image sorting applications. A typical annotation of type 2 would be "Mom and dad arriving" or "the ice bears, Kevin's favorite animals".

In the case of the type 3 comment, the user would place some right-aligned text in between graphical representations that is associated with the subsequent graphical representations (plural). Optionally, arrows or other graphics (not shown) can be added to embellish the story even further. The user would not have to define how many graphical representations are affected; the user does not need to define it. This reflects the observations of people speaking about digital media, comments about the "next digital media" appear to be often made without reference to an actual count of digital media. Typical annotations of type 3 would be for example "the next short videos & photos are of Stockholm" or "I need to select one of these group digital media for the postcard" or "the next digital media show really weird Peruvian butterflies, note: many images are blurry".

In the case of the type 4 comment, the user performs a mouse-drag operation to associate a comment to a digital media detail. For instance, the user might have created an annotation of type 2 describing the digital media in general, but can notice that the comment refers more to a digital media detail. For instance, the user might have photographed an interesting sign, such as, for example, a funny spelling mistake. Later, when seeing all the thumbnails, the user will notice that the comment cannot be understood unless the detail is pointed out. Then the user can draw a connector line between the text and the digital media detail and hence creating an annotation of type 4. Alternatively the user can directly create an annotation of type 4. Typical annotations of type 4 would be "look at that stain on Ashley's t-shirt—the farmer's dog rubbed his nose on it there" or "on that sign you can see the phone number of the vacation apartment, let's go there next year" or "look at that ugly guy in the background" or "Jennifer actually jumps from that rock, you can see that in the background".

In general, the invention is not limited to these 4 types of annotations between graphical representations, a fifth one will follow below, and other annotation types are annotations for multiple digital media or video details, annotations that relate a given media instance to another media instance ("here the funny car was still driving, check out how it looks in→this digital media"), possibly including a link or pointer to a digital media or media instance somewhere else in the collection. A type of longer annotations can be received, within a single word or phrases can be linked to different graphical representations.

In one embodiment, the user can turn all comments on or off. In another embodiment, the user can shrink the text relative to the digital media size. In a preferred embodiment, the user can toggle between a view mode of full text display and a viewing mode where all comments are abbreviated as icons, using little arrows to the left and right to mark them as types 1, 2, 3, 4 or 5. In yet another embodiment, comments of type 1 are hidden, particularly if many comments are added to a digital media series, type 1 will be expected to exceed the other 3 types in count. On the backside of the graphical representations, it is a "digital media flipping tool" is required that animates the digital media to rotate and show its (virtual) backside. Although digital media do not really have a backside, many users appear to easily comprehend this as some unused space available for comments.

Alternatively, in another embodiment, the abovementioned backside comments can be identified as a type 5 comment, so that type 2 comments are a per-digital media comment for the sake of telling the story, while the backside of the digital media could be used to store other information, such as pre-noted text for a postcard or notes-to-self and the like as a type 5 comment.

Figure 3:
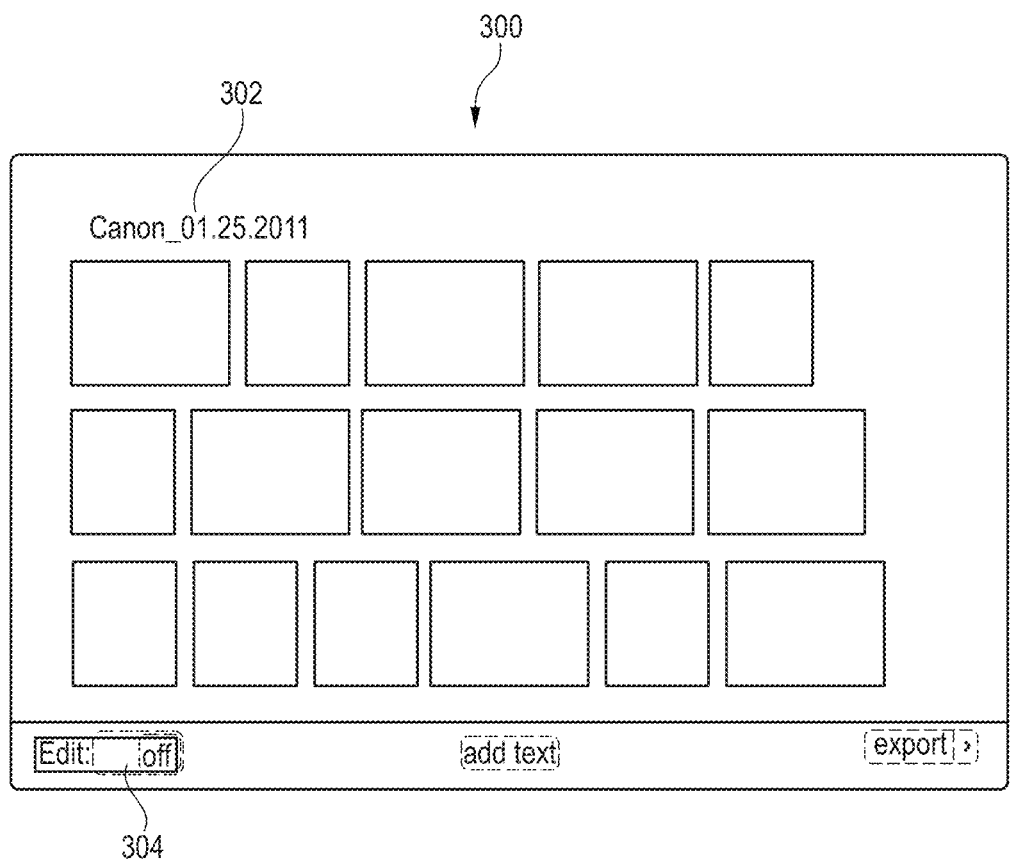
FIG. 3 is a diagram of a narrational media organizing system for transforming digital media into a personal, memorable story with minimal user input according to another embodiment of the present invention that uses gestures from a user.

Referring now to FIG. 3, there is shown a diagram of a narrational media organizing system for transforming digital media into a personal, memorable story with minimal user input according to another embodiment of the present invention that uses gestures from a user. As can be seen, [Figure 300] shows a similar User Interface, this time for devices that do not feature pointing devices but use gestures, such as, for example, index finger tapping. A collection of digital media is shown in this drawing. At the bottom there is an "edit" button 304, indicating that currently the NMO environment is in "view" mode, hiding all elements not needed for viewing (interactive buttons, shrunken/hidden digital media, etc). The media event's name/folder name can be displayed 302 as one initial, default type-5 comment, aka Headline.

Figure 4:
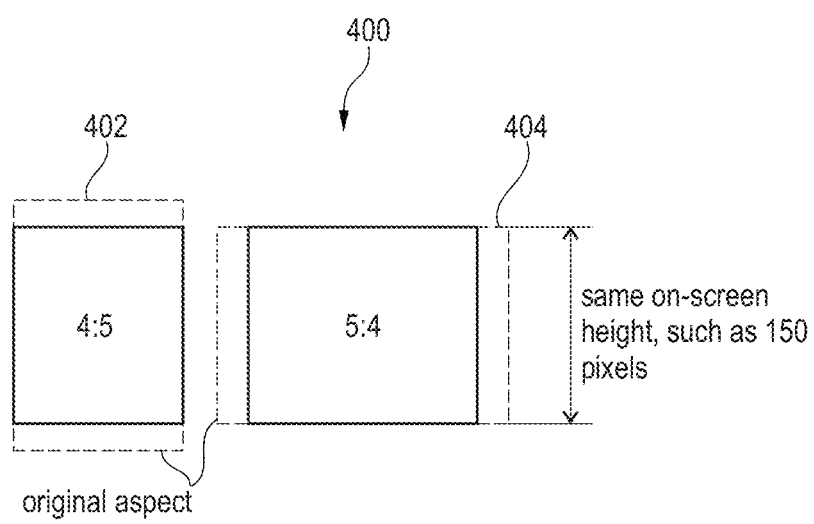
FIG. 4 is a diagram illustrating digital media resizing so that each of the digital media is displayed at the same height.

Referring now to FIG. 4, there is shown is a diagram illustrating digital media resizing 400 so that each of the digital media is displayed at the same height. As can be seen, digital media typically has two shapes, portrait 402 and landscape 404. Disadvantageously, these two shapes are not convenient for arranging digital media in a meaningful way. The NMO environment 100, resizes all the media in the environment so that they are approximately the same height, for example 150 pixels. This makes the portrait 402 shaped digital media significantly smaller in screen real estate than landscape 404 digital media including videos. Some current programs solve this issue by placing similarly sized image and grouping them together. While other implementations solve this issue by bringing all digital media to square format. Neither of these approaches is useful because grouping similarly sized images together changes the order making it more difficult to narrate a story, or even remember what the image was related to, and the straight cropping can prevent the user from seeing important details that may be eliminated during cropping. The NMO environment uses a more benign aspect ratio, such as 4:5 that can be achieved through non-destructive cropping, non-uniform scaling, or a combination of both. After this transformation is done, the preview graphics of the graphical representations/digital media can be displayed all at the same height, still indicating the different natures of landscape 404 vs. portrait 402 format, but not at vastly different actual on-screen sizes. This way, a uniform distant horizontal space between digital media can be maintained, optimally using screen real estate without forcing digital media to be displayed in squares.

Figure 5:
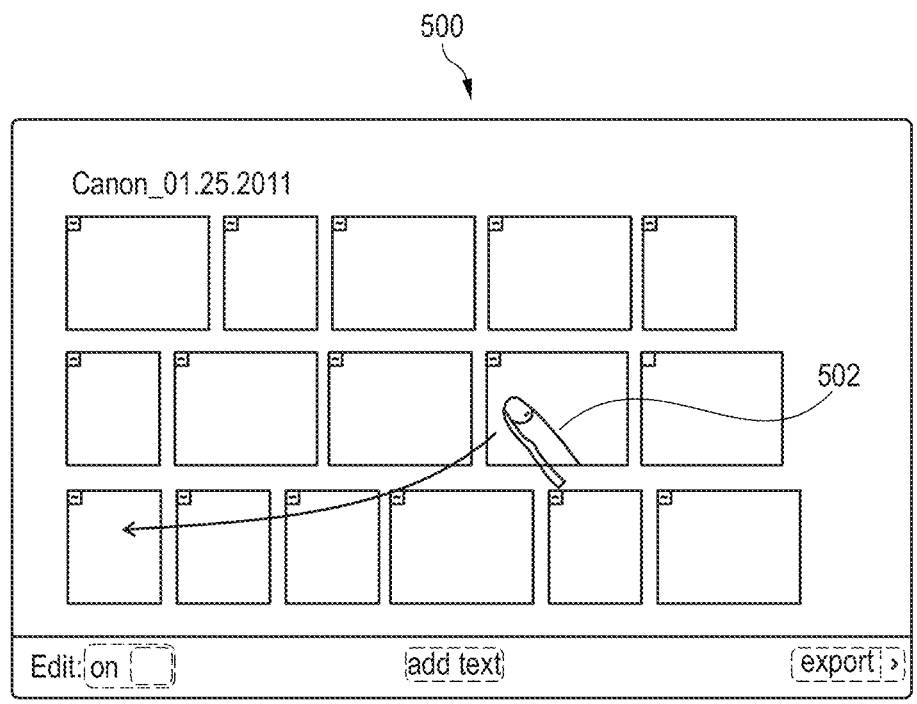
FIG. 5 is a work flow diagram illustrating a gesture-operated interaction for a paragraph/headline creation useful for the system of FIG. 3.

Referring now to FIG. 5, there is shown is work flow diagram illustrating a gesture-operated interaction 500 for a paragraph/headline creation useful for the system of FIG. 3. As can be seen, the gesture-operated interaction 500 for a paragraph/headline creation allows the user to tap and hold a first digital media in a desired paragraph, and then drag the first digital media down and to the left, so that at the spatial location 502 of a new paragraph can be created.

Figure 6:
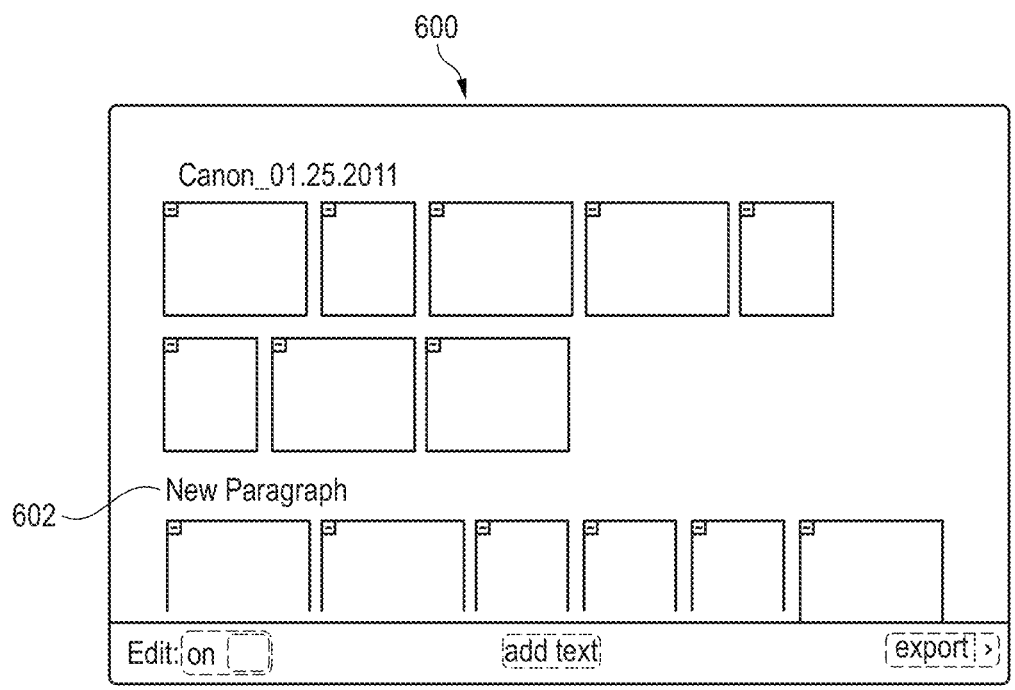
FIG. 6 is a diagram of a paragraph completed as a result of the interaction shown in FIG. 5.

Referring now to FIG. 6, there is shown is a diagram 600 of a paragraph completed as a result of the interaction shown in FIG. 5. As can be seen, the diagram 600 shows a new paragraph 602, including a placeholder for a headline for the paragraph 602, is the result of the interaction shown in FIG. 5.

Figure 7:
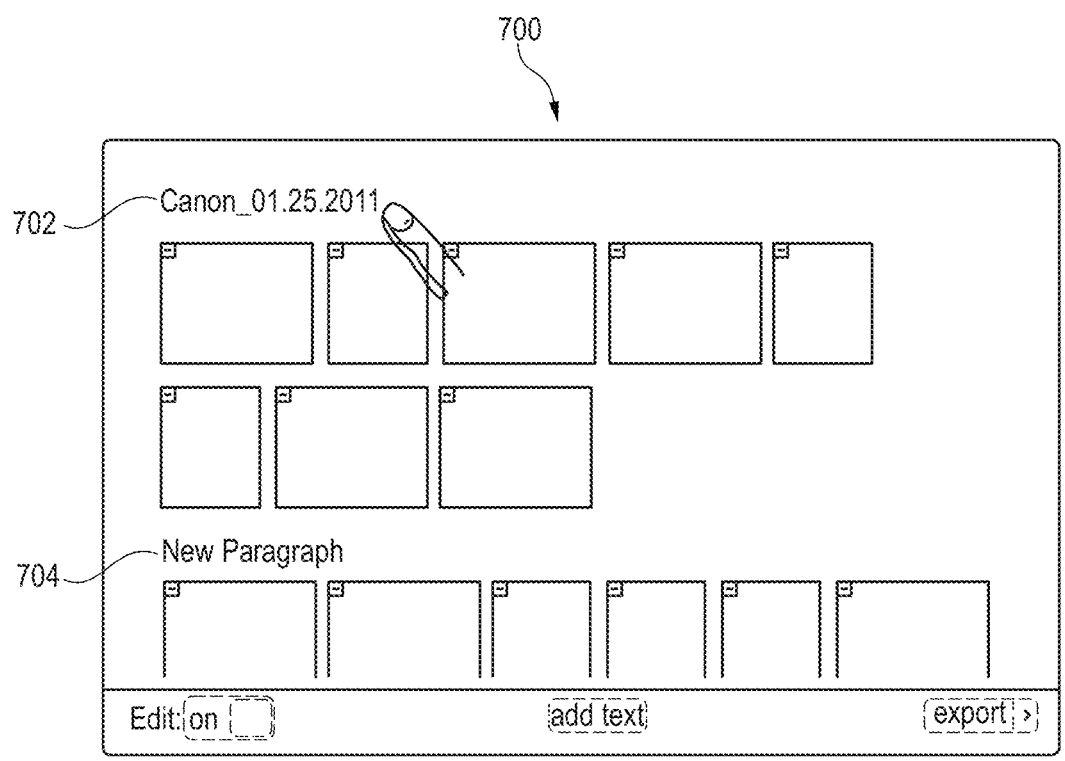
FIG. 7 is a diagram of a user gesture on a headline useful for the system of FIG. 3.

Referring now to FIG. 7, there is shown a diagram of a user gesture on a headline 700 useful for the system of FIG. 3. As can be seen, the user taps on a headline 702 (a type 5 comment) with an undesired text that sends a command to the system 700 to edit the textual annotation. The user can also edit the placeholder 704 created in FIG. 6.

Figure 8:
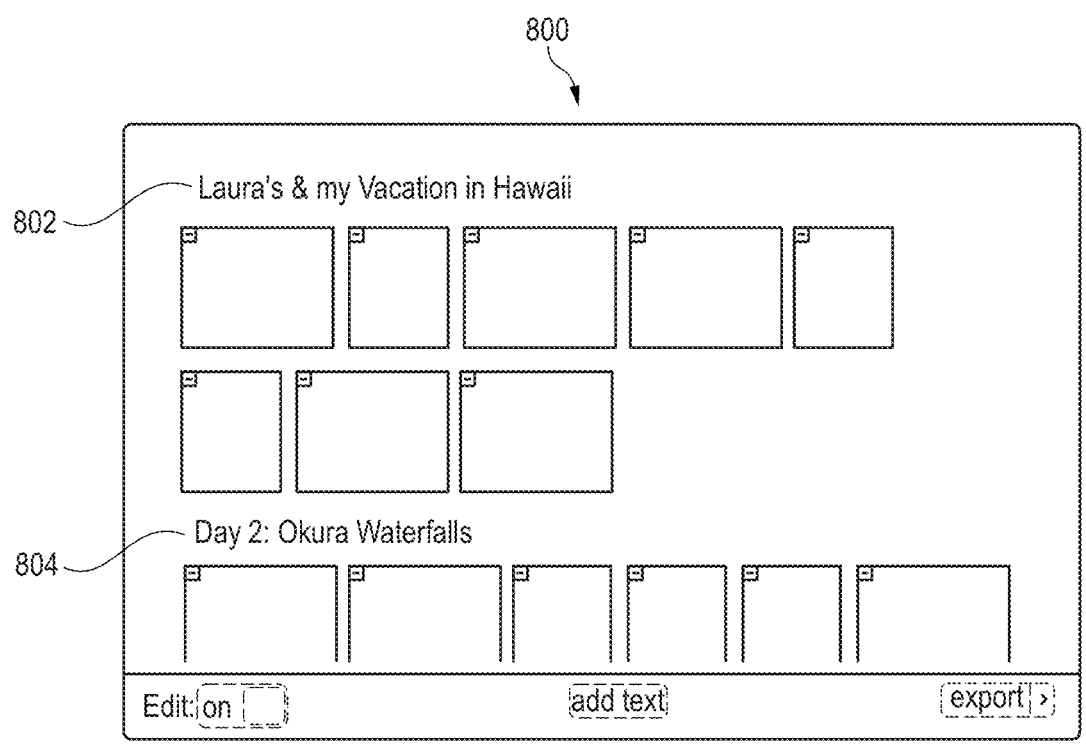
FIG. 8 is a diagram of an edited headline of FIG. 7.

Referring now to FIG. 8, there is shown a diagram of an edited headline 800 of FIG. 7. As can be seen, the edited paragraph headlines 802 and 804 have been changed to reflect the contents of the digital media beneath each of the headlines. As can be appreciated, this type of annotation is significantly faster, easier and more meaningful to the user than traditional tagging and commenting can provide.

Typical examples for such headlines would be: "Day 2 of our vacation" or "At the wedding chapel" or "The Boat trip". A typical example for a standard text size sub caption would be "Lots of digital media of fish that you can't see well, some digital media to be deleted" or "on day 2 of our vacation we drove through the cities of Belington, Bakersfield and St Anton".

Figure 9:
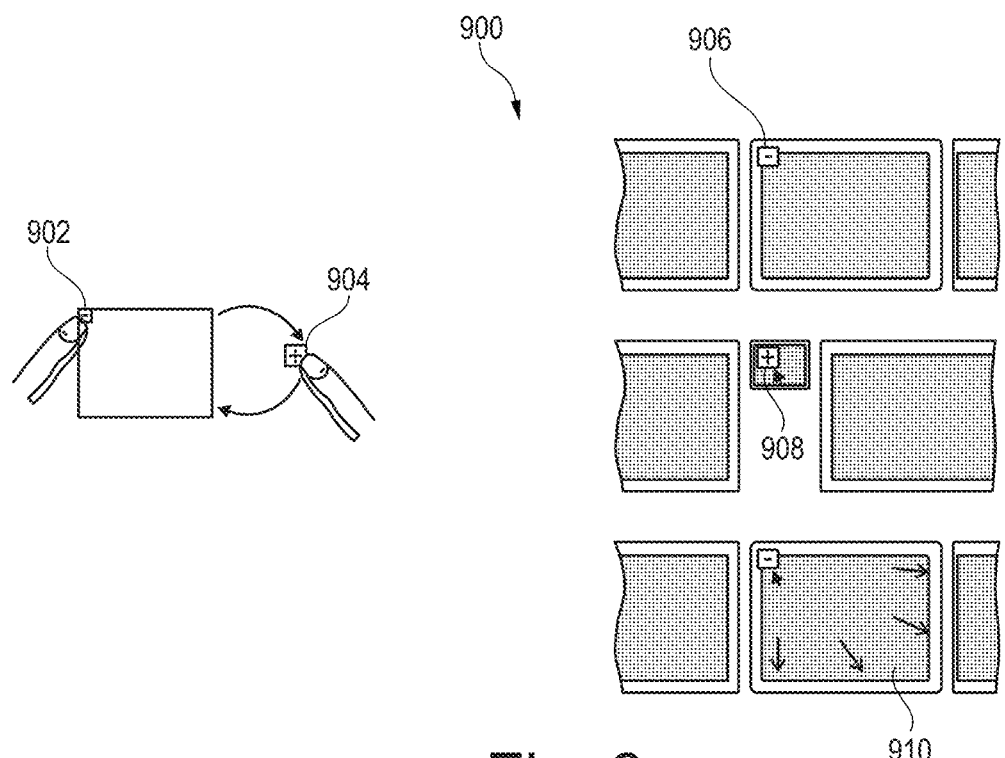
FIG. 9 is a diagram illustrating a graphical display of a hiding/unhiding cycle useful for the systems of FIG. 1 and FIG. 3.

Referring now to FIG. 9, there is shown a diagram of a graphical display 900 illustrating a hiding cycle 902 and a unhiding cycle 904 useful for the systems of FIG. 1 and FIG. 3. The process of hiding/unhiding can also be referred to as minimizing/maximizing or excluding/re-including of digital media or graphical representations. As can be seen a graphical display can be used to make the digital media/digital media instance visually non-distracting from the remaining story, and also simultaneously indicating that the digital media is not physically deleted. Various formatting options for the hiding portion of the cycle can comprise replacing the digital media with a smaller version, replacing the digital media with a small icon, or placing the digital media off-site in an area denoted as to-be-excluded-from-narration.

According to one embodiment, a user taps on a minimizing icon 902 associated with the digital media to be excluded. The user can alternatively tap on the maximize icon 904 of the same digital media/media instance to unhide the digital media again, indicating that the digital media is to be included in the output. Alternatively, the digital media can be maximized to check what is hidden and then it can be minimized again. In a traditional computer setting, the icons 906, 908 show the similar cycle using mouse clicks to minimize and maximize the digital media. In another embodiment, the minimized digital media can be animated 910 when it is maximized. By hiding the digital media, less screen space is used, allowing the remaining digital media to move closer together, while at the same time indicating to the user that the digital media is not physically deleted. In another embodiment, if the storage available to the user on the computing device or online storage is insufficient, the NMO environment can display a dialog to the user to destructively downsize the minimized/shrunken digital media to a lower resolution, bit rate or frame rate, without altering the non-excluded digital media, that are still be available at full resolution and none of the digital media is actually deleted, thereby providing more available storage space. Alternatively, the digital media can be compressed, subsampled or both compressed and subsampled using standards bases methods, such as, for example, JPG, JPG2000, etc.

It is very typical that, in the age of digital cameras, many digital media/graphical representations are made for ensuring that at least one good digital media of a scene is captured, such as, for example, a sunset. Afterwards the user either has to leave all graphical representations in the collection if the user doesn't want to delete any (users appear to be very hesitant to permanently delete digital media), or one of the sunset graphical representations needs to be flagged as "good", or the other digital media need to be moved to a "b digital media" folder, and so forth. In any case, the treatment of digital media that do not really contribute to the story (boring, out of focus, double take, people not smiling) etc. is difficult, particularly if the user is not inclined to permanently deleting digital media. It is noted that today's cheap permanent memory availability the need to get "rid" of a digital media/media instance is more of an issue of getting the digital media/media instance mentally out of the way, less an issue of saving memory and saving space.

In an NMO editing world, the user can click on a small button 902 on the top left corner of the digital media and thereby shrinking the digital media's display to a smaller size 908, for instance $\frac{1}{4}^{th}$ or $\frac{1}{9}^{th}$ the original size. That way the user will still see that the digital media is there, not deleted, and a second click on the digital media can bring it back in case it is needed or in case one wants to see what's in there. Because, the user can not predict what digital media will be important years later. For example, maybe the family's pet depicted in one of the digital media dies a few days later, rendering at digital image of the pet that was first thought to be boring, suddenly important. There are many advantages of this system such as: unimportant digital media are optically out of the way, but not deleted. The hidden digital media can be brought back at any time, since bringing them back is easy. The user will not be hesitant to make active use of this feature, effectively adding clarity to the narration, shrunken digital media can automatically be excluded from output without needing to manually rearrange or manipulate the entire story. Shrunken digital media can automatically be excluded from searches, although the default behavior is to include all digital media in searches.

Figure 10:
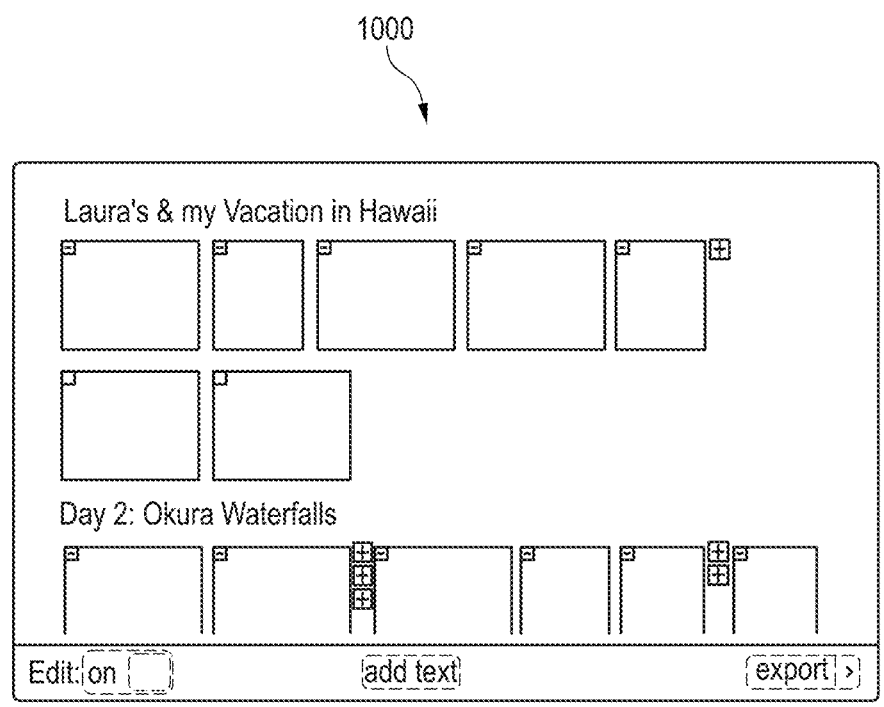
FIG. 10 is a macro view diagram of hidden and displayed digital media useful for the systems of FIG. 1 and FIG. 3.

Referring now to FIG. 10, there is shown a macro view diagram 1000 of hidden and displayed digital media useful for the systems of FIG. 1 and FIG. 3. As can be seen, the user has minimized some less desirable graphical representations that are represented as small boxes with plus signs in this embodiment.

Figure 11:
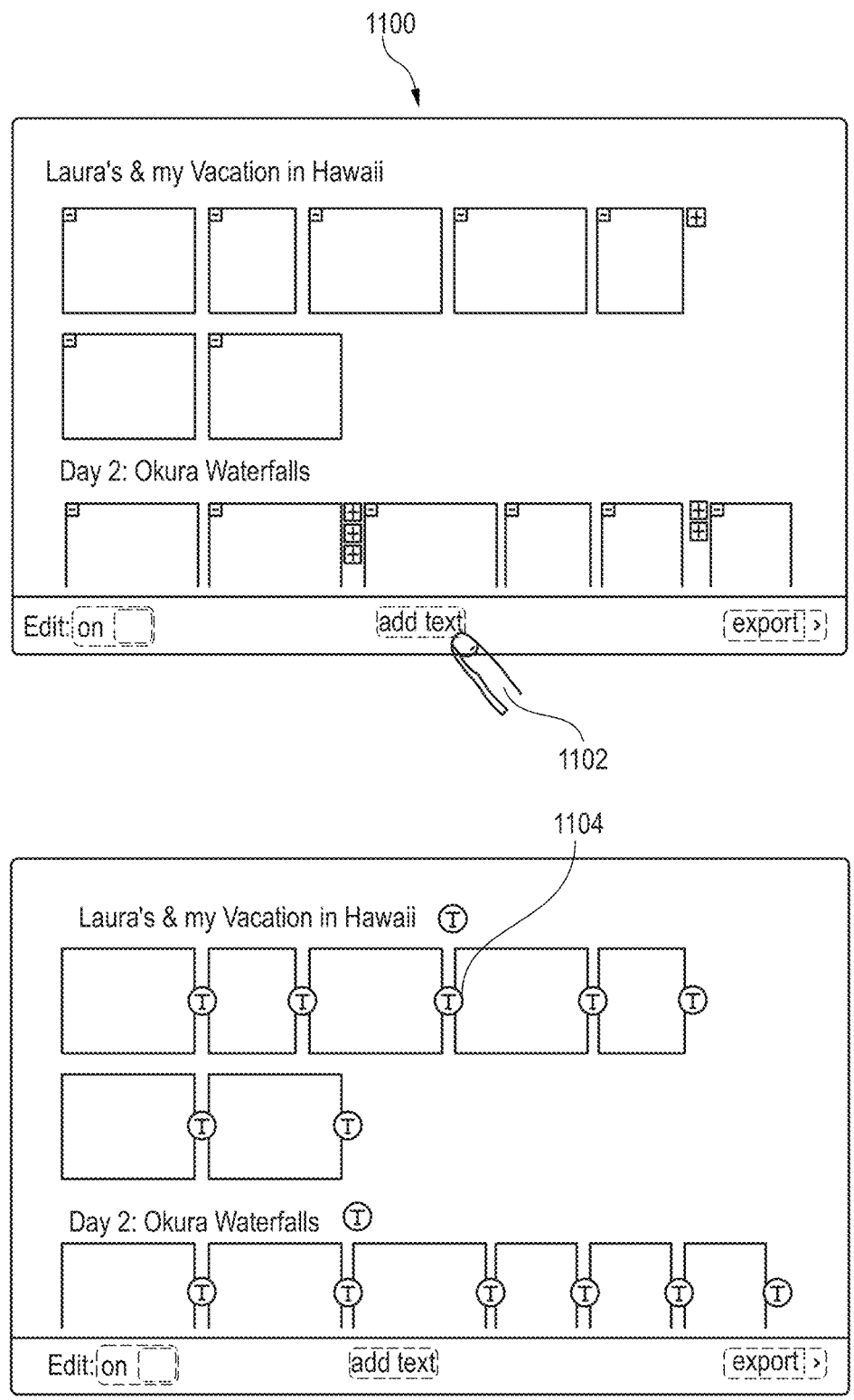
FIG. 11 is a diagram illustrating another user gesture for adding text into the system of FIG. 3.

Referring now to FIG. 11, there is shown a diagram illustrating another user gesture for adding text 1100 into the system of FIG. 3. In this embodiment, the user clicks or taps on a button 1102 to send a command to the user interface that text is to be added. The user interface responds by altering the graphical display to indicate to the user one or more locations 1104 where text can be added. When the user clicks or taps on one of the locations 1104 will trigger the NMO environment software to receive a text/annotation at that location.

In one embodiment, annotations are displayed in a font proportional with the digital media size, when the digital media is displayed at a certain height on the screen, the character height of the text should not exceed a fraction of that digital media height. This means that in relatively small digital media, the annotations may no longer be legible. The user will only be able to see that there is a comment with the digital media. If the media preview size is chosen to be very small, the user may have no interest in actually reading the text, knowing that the text is there may be enough to stay oriented.

In another embodiment, with respect to larger digital media viewing, the character size of the comment text will not exceed a certain height, such as 12 pt.

Figure 12:
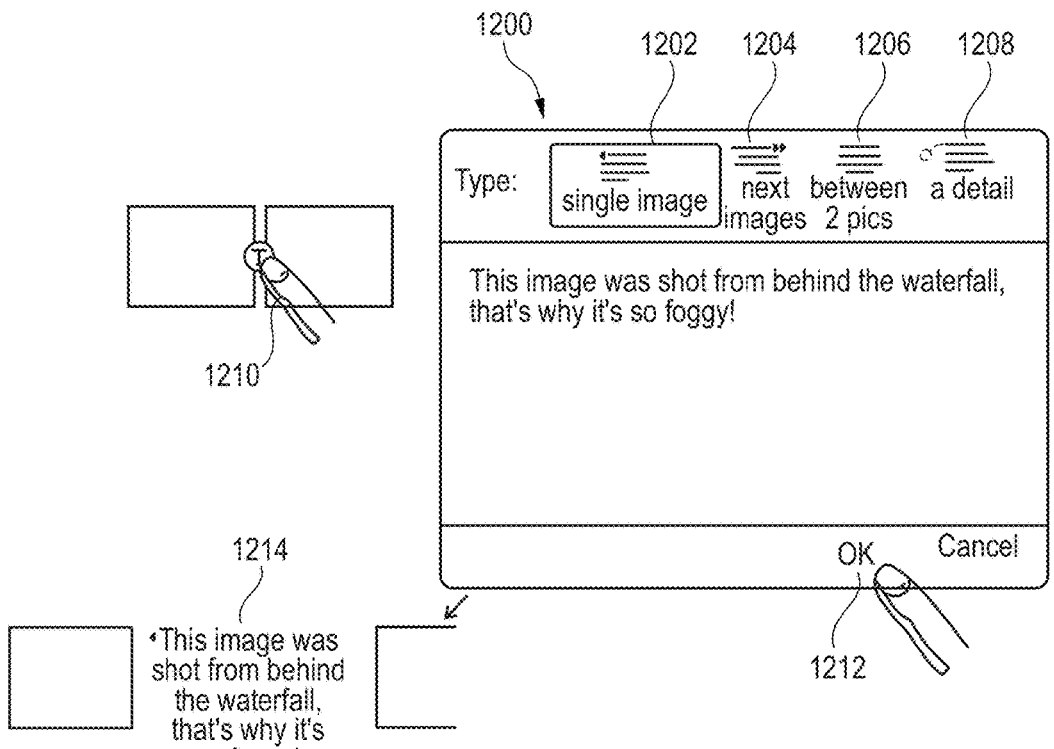
FIG. 12 is a diagram illustrating how text is entered into the system of FIG. 3 according to one embodiment of the present invention.

Referring now to FIG. 12, there is shown a diagram illustrating how text is entered 1200 into the system of FIG. 3 according to one embodiment of the present invention. As can be seen the user selects an annotation location 1210. Then a user interface displays a dialog box or other means for the user to enter text. Optionally, the type of the comment 1202, 1204, 1206 and 1208 can be selected. Alternatively, for an existing comment, the user can edit the annotation, change the type of the annotation or add other style elements to the comment, such as, for example, bold, italics, underline, etc. Next, the user finishes editing the comment and clicks or taps an OK button or some other indicator to inform the user interface to accept the edited text. Then, the comment is displayed 1214 in the NMO environment at the location 1210 the user selected.

Many users do not want to make many decisions. Therefore, in a preferred embodiment the user can begin by placing annotations in between the graphical representations 1210 initially in a single type (type 1) of comment in order to remove the discomfort of continuously choosing the appropriate comment type. Then, after having written some comments (or many comments), the user can be more precise with respect to the type of comments. Then, the user can then click on a comment an assign a type to it. Alternatively, the type can be assigned directly after writing the comment.

In another embodiment, a comment is assigned by the user clicking on one of four buttons displayed 1202-1208 within the context of the comments, such as above or below.

In another embodiment, the comment type is selected at the moment of creation, based on area assignments on where the user clicked when placing the cursor. For example, using the space between digital media, the user can position a comment of type 1 by clicking directly in between digital media, of type 2 when clicking on the right margin of a digital media, of type 3 when clicking on the left margin of a digital media, and of type 4 when clicking on a digital media. Alternatively, the user can choose within the NMO toolbar between four types of NMO cursors, each one to create a comment type. In another embodiment, the user ends a comment with a return key, and then to request the user to choose the type of comment after writing the comment, such as displaying a menu with four icons, where the user can select others with the cursor keys and confirm the selection with the keyboard.

In a particularly preferred embodiment creating different annotation types is performed by segmenting the space between the digital media into two or more positions, such as, for example, at the horizontal center, one at the top, one in the middle, and one at the bottom. The top cursor position would sport a cursor with a little triangle to the left, indicating that a type 2 comment would be created, the center position would be a plain cursor, representing a type 1 comment, and the bottom position would be reserved for type 3 comments, the cursor icon having a little double-arrow to the right. The assignment of the segments can be user selectable. A type 4 comment could be created by grabbing a comment at a pre-defined anchor point (or anywhere) or by its triangle and dragging it to the desired digital media detail.

Figure 13:
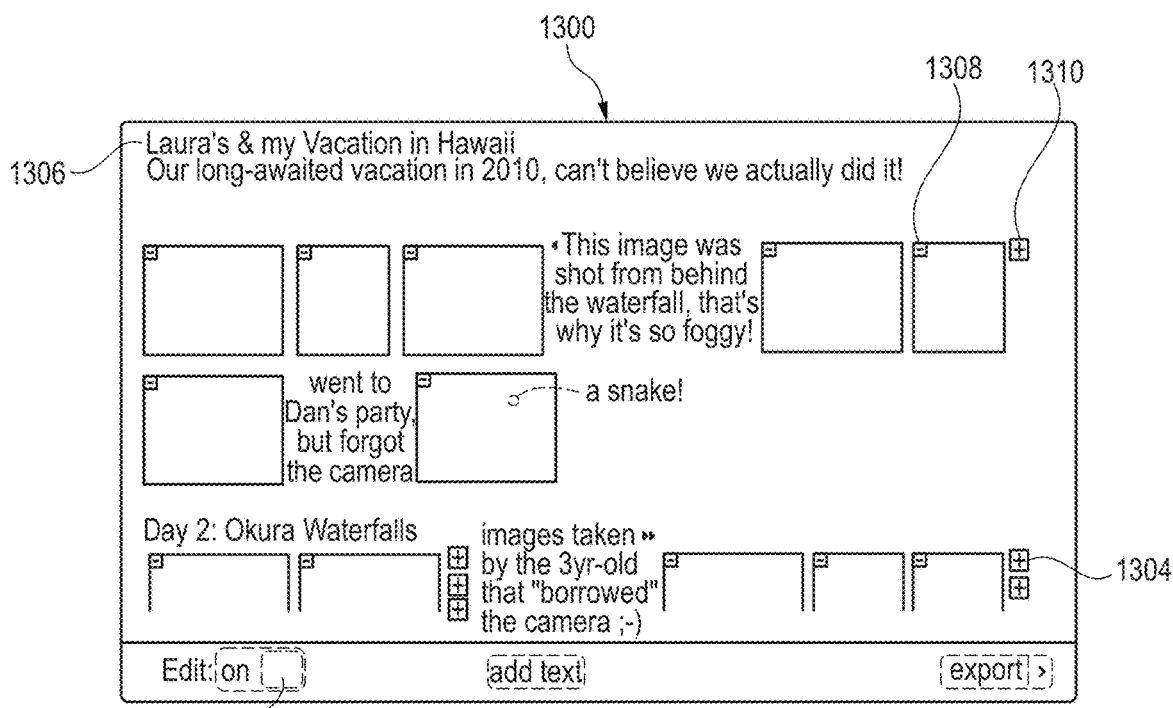
FIG. 13 is a diagram illustrating a completed narration of the digital media.

Referring now to FIG. 13, there is shown a diagram illustrating a completed narration 1300 of the digital media. As can be seen in this embodiment, the editing mode 1302 is still active, thereby displaying elements on the user interface necessary for NMO interaction, such as the minimize 1308 and maximize 1310 buttons, the representations of minimized digital media/graphical representations 1304 and editable headlines 1306. In one embodiment, the editable headline 1306 also comprises a sub-headline, allowing more annotations per paragraph in a smaller text size.

Figure 14:
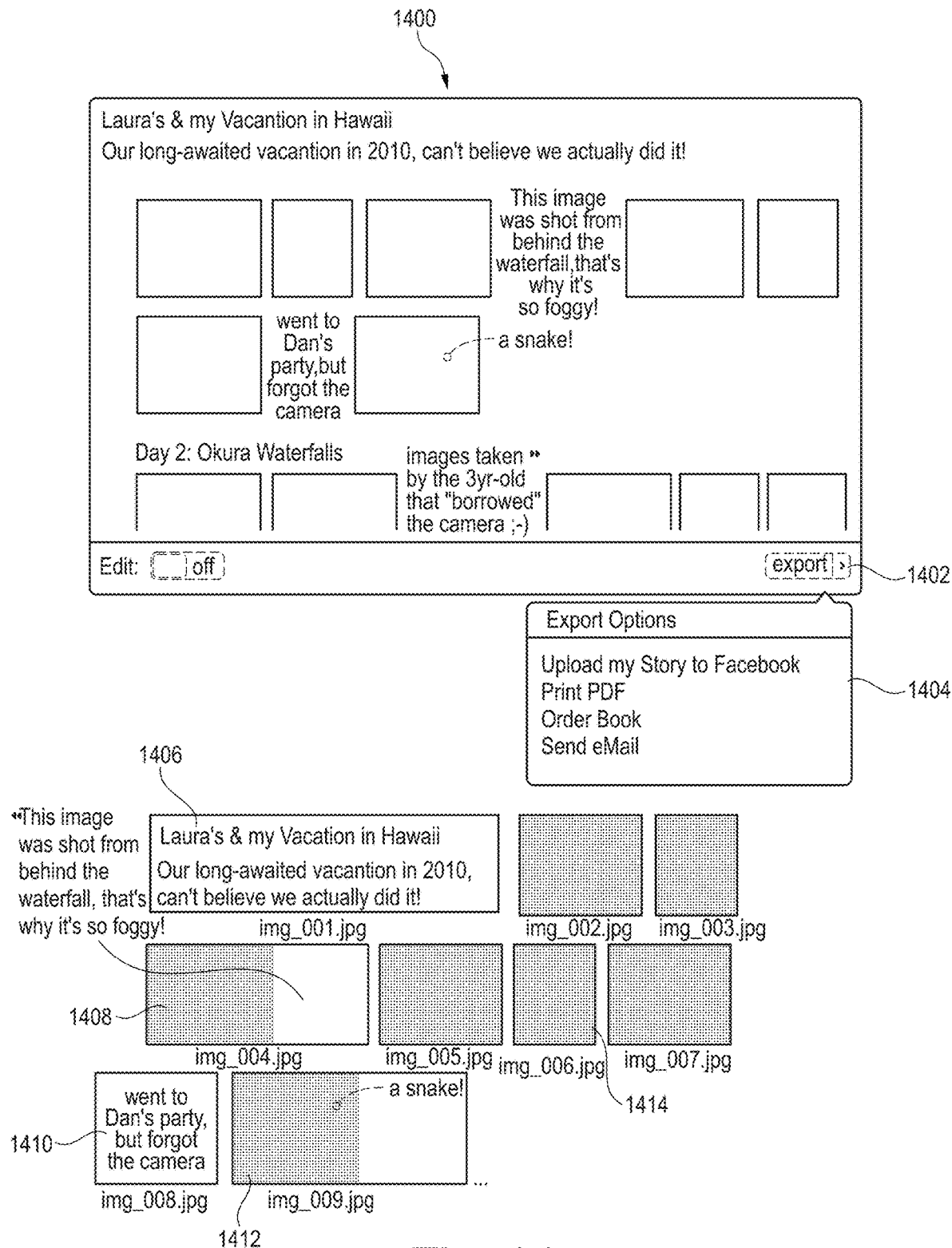
FIG. 14 is a diagram illustrating export options of the systems of FIG. 1 and FIG. 3.

Referring now to FIG. 14, there is shown a diagram illustrating export options 1400 of the systems of FIG. 1 and FIG. 3. As can be appreciated, the system 100 must be able to export or save the NMO environment to be useful to the user. In one embodiment, there is provided an export button 1402 that the user can click or tap once the user is satisfied with the version of their story. Once the user selects the export button 1402, an export dialog 1404 can be shown providing the available export options. Optionally, the user can chose to include or not include the hidden digital media. The choice to include the hidden digital media placeholders can be used as a preview of the output so the user can decided whether or not to include or exclude more digital media. The export options include various printed formats as well as various digital formats that the user can select.

In one embodiment, the NMO environment is exported as a series of digital image files 1406, 1408, 1410, 1412 and 1414 that comprise the headline and the digital media with associated text in the same image file. In other words, the original digital media file is converted to a new digital media file that includes an image of the text and the original digital media. Optionally, just the text 1410 and the digital media are output interwoven with each other. With this option, the digital media and the comments can be emailed or uploaded to a community service without the need for specialized software.

Referring now to FIG. 15, there is shown a diagram that illustrates a selector 1500 that allows the user to apply a style to the digital media collection. In this embodiment the user interface displays an extended version of the NMO environment. As can be seen, there is a button 1504 that allows the user to apply a style to the digital media collection. In another embodiment, the user interface provides a button 1506 so that the user can add a filter to all the digital media, giving them a certain style. Optionally, the applied style can add a background design, graphic, texture behind the digital media, or assign a font or font set for the comments in the NMO environment, and other design features such as layout and spacing. In one embodiment there is provided a button 1508 suitable to further edit the digital media's style, once a style has been added to all digital media. The user can click on the filter button 1508 to remove 1510 the filter from a single digital media, or to edit parameters 1512 of the given filter, or to add an additional effect 1514 to this digital media.

In another embodiment there is provided an icon 1502 that indicates that the digital media is a favorite. In this instance the icon 1502 is in the shape of a heart, but other icons can be used.

Figure 16:
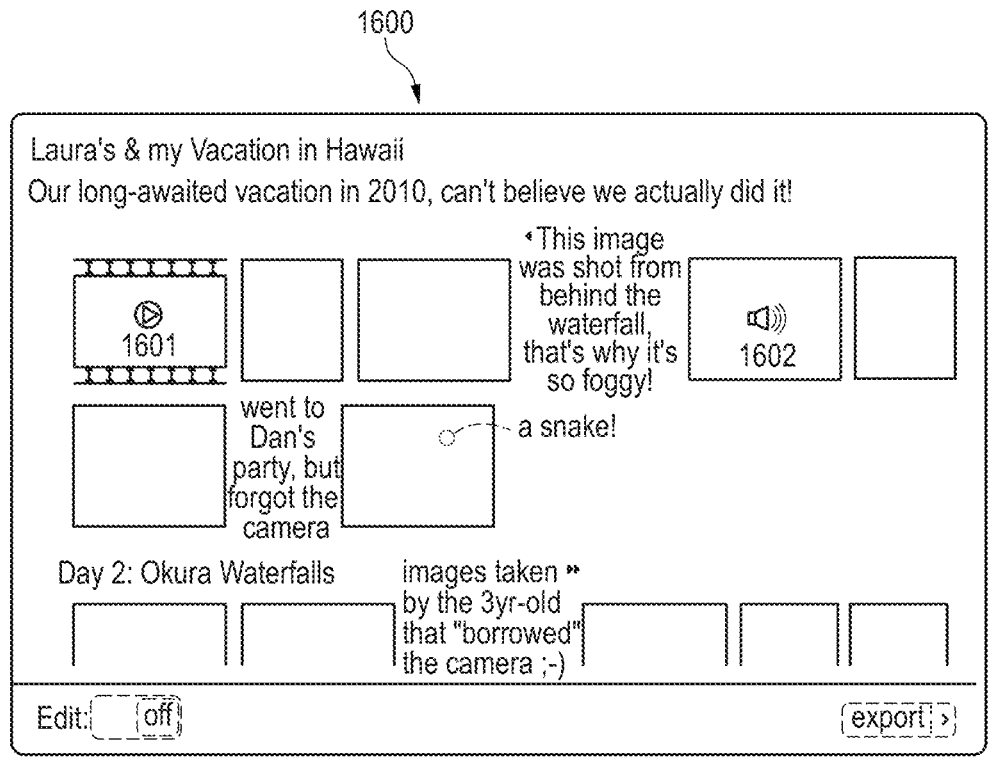
FIG. 16 is a diagram of an NMO environment comprising various digital media file formats that can be used in the systems of FIG. 1 and FIG. 3.

Referring now to FIG. 16, there is shown a diagram of an NMO environment comprising various digital media file formats 1600 that can be used in the systems of FIG. 1 and FIG. 3. As can be seen, the user interface displays an NMO environment comprising images, video footage 1601 and audio material 1602. Other data, such as 3D graphics, illustrations, scans, or RAW digital media data or other data suitable to compose digital media, can also be used in the NMO environment.

Figure 17:
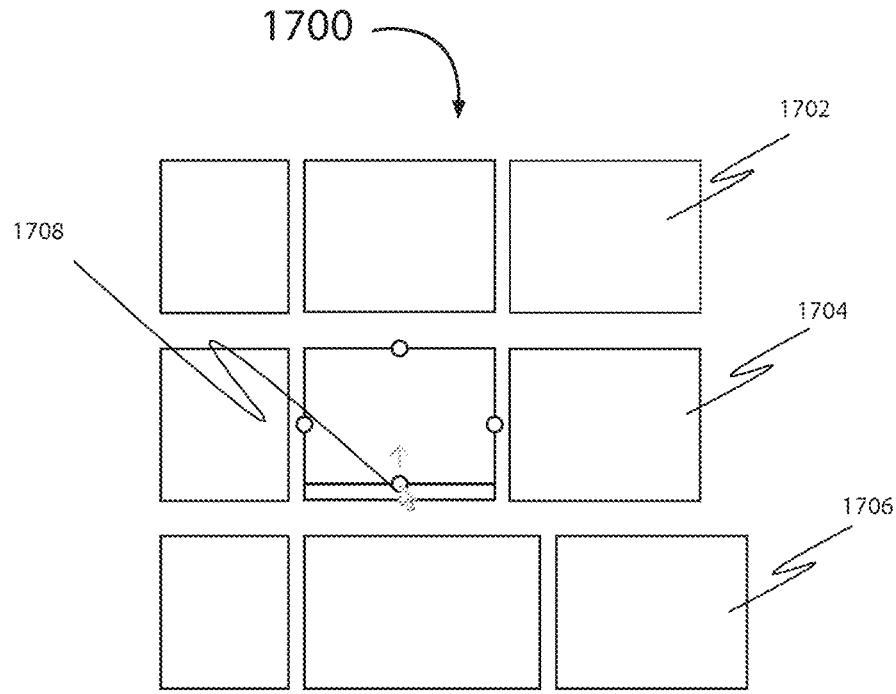
FIG. 17 is a diagram illustrating a cropping functions useful in the systems of FIG. 1 and FIG. 3.

Referring now to FIG. 17, there is shown a diagram illustrating a cropping function 1700 useful in the systems of FIG. 1 and FIG. 3. As can be seen, within the NMO system, the digital media can be cropped. The standard layout 1702 can be altered by the user using the cropping function 1700. In one embodiment, selecting the digital media on the user interface brings up cropping devices 1708 such as, for example, corner or edge-buttons for redefining the crop. Once the user has cropped or expanded the digital media, the NMO environment will automatically rescale the digital media accordingly to bring it back to its original height, possibly leading in a longer width 1706. This feature allows the user to quickly modify the digital media without having to manually adjust the entire layout.

Figures 18, 19:
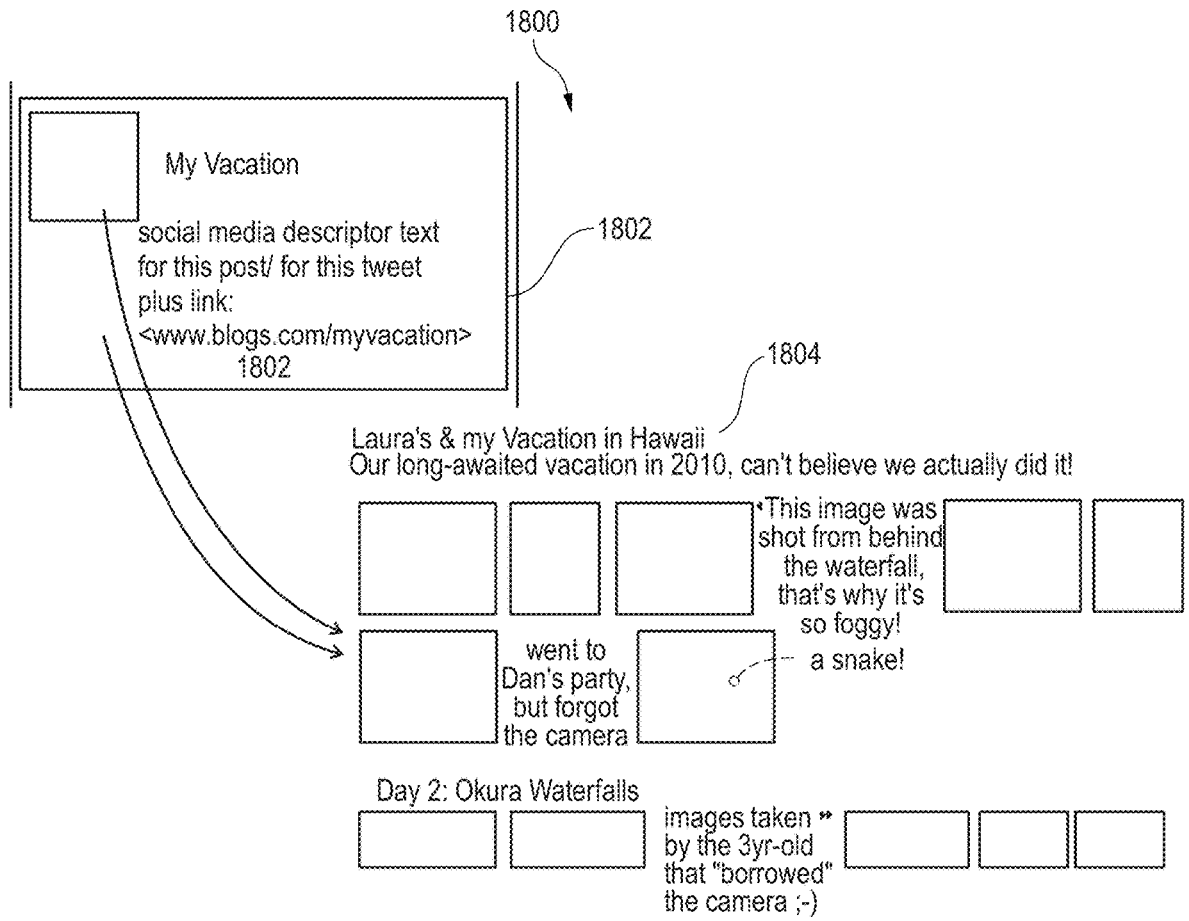
FIG. 18 is a diagram illustrating how a completed narration can be upload to a web page.
FIG. 19 is a diagram of a data structure for storing the NMO environment according to one embodiment of the present invention.

Referring now to FIG. 18, there is shown a diagram illustrating how a completed narration can be uploaded 1800 to a web page. In addition to sharing a story by email, as shown in FIG. 14, the user can also upload a "post" or "message" 1802 to a web community, such as Facebook or Flickr, where an icon (book, leading digital media, and geographic map) or a story title, or both, is displayed to represent the story. A link 1802 from the web community will take the user to a website or a blog 1804, where the entire story in a completed graphical form is available to be viewed. Due to the nature of most social web communities, the user has the option of allowing everyone to view the story or only allowing "friends" to see the story.

Referring now to FIG. 19, there is shown a diagram of a data structure 1900 for storing the NMO environment according to one embodiment of the present invention. As can be seen, there is provided a data structure comprising a series of paragraph headers 1902, digital media or other graphical representations 1904, styles or comments 1906. The data structure 1900 can have either textual contents, actual digital media data or links 1908 to the digital media files. In one embodiment the digital media instance detail or comment detail can be stored with the entry 1906, such as whether the digital media is hidden, the type of a comment, whether a digital media was cropped, what filters were applied to the digital media, etc.

Figure 20:
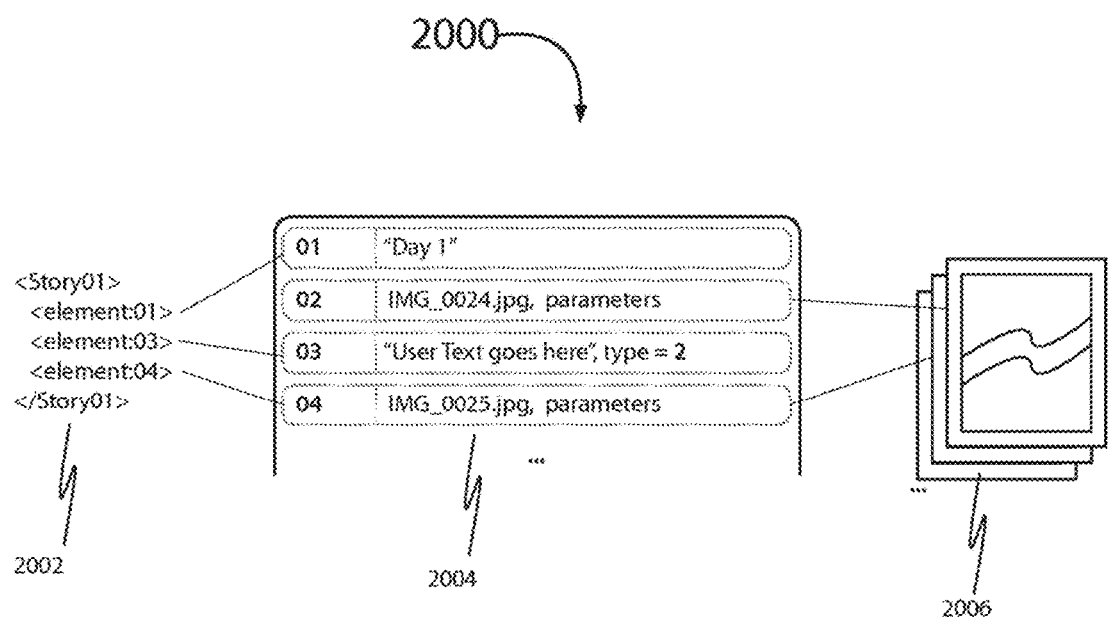
FIG. 20 is a diagram of a data structure for storing the NMO environment according to another embodiment of the present invention.

Referring now to FIG. 20, there is shown a diagram of a data structure 2000 for storing the NMO environment according to another embodiment of the present invention. In this embodiment, the data structure 2000 comprises a list of references 2002 to digital media 2006 that may or may not include all digital media, and a list of the digital media and comments 2004, that can be a list to a series of digital media or media data 2006. This data structure 2000 has the benefit that a complete list of data can be kept in a storage (not shown), for example if the user wants to view and inspect the original digital media or media collection, while the list 2002 itself is flexible to exclude or include digital media, change the sequence of digital media. Also, different instances of the list 2002 can be kept in memory without requiring different instances of digital media and comment lists 2004.

Figure 21:
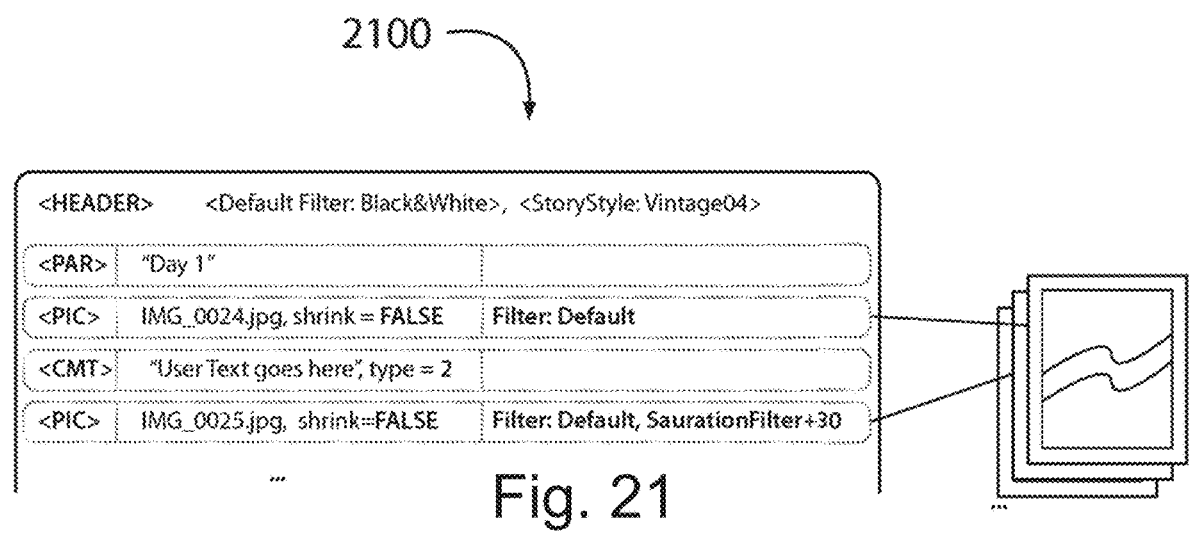
FIG. 21 is a diagram of a data structure for storing the NMO environment according to another embodiment of the present invention.

Referring now to FIG. 21, there is shown a diagram of a data structure 2100 for storing the NMO environment according to another embodiment of the present invention. In this embodiment, the NMO digital media story data structure 2100 reserves room for a header that can store data such as a title for the entire digital media collection, a style, a default filter, a background graphic, a currently active zoom state or a display/paper/print format and size.

Figure 22:
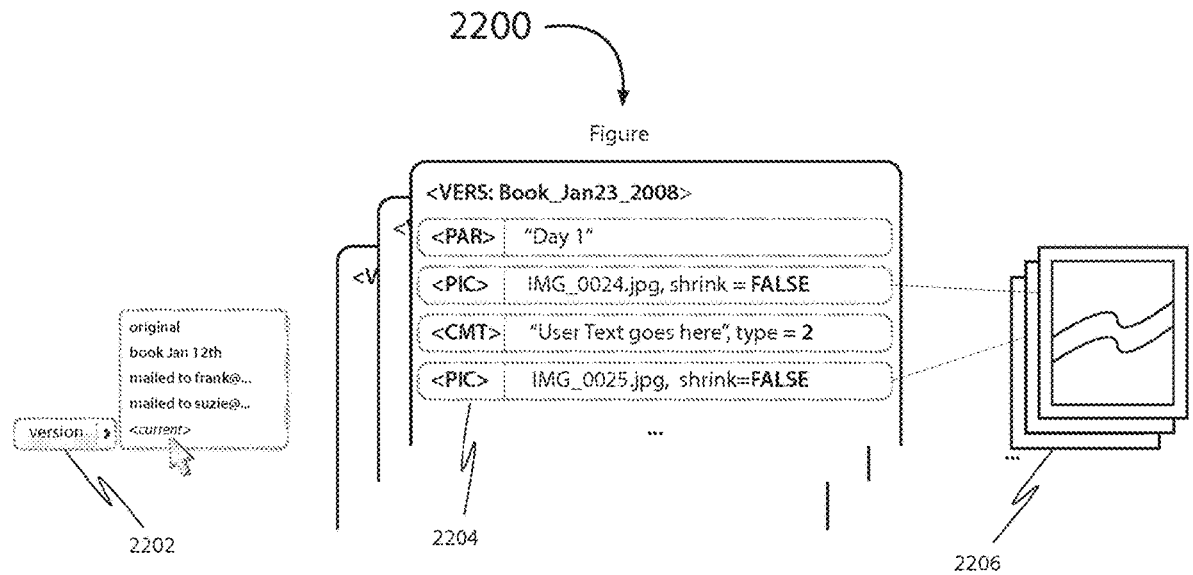
FIG. 22 is a diagram of a data structure for storing the NMO environment according to another embodiment of the present invention.

Referring now to FIG. 22, there is shown a diagram of a data structure 2200 for storing the NMO environment according to another embodiment of the present invention. In this embodiment the NMO digital media story data structure 2200 provides a series of story lists 2202. In this embodiment, the NMO environment can save multiple versions of a story 2204 that all evolve around the same data set of media 2206. For example, every time the user creates a book, or a blog, a version of the story can be saved, so that the user knows what status the story had been in when creating a book or an email or a blog or any other means of output of the story.

Each of the data structure 1900, 2000, 2100 and 2200 described above comprise at least one or more than one fields for storing a list of digital media elements information;

one or more than one fields for storing annotation information; and one or more than one fields for storing paragraph information. Additionally, the data structures 1900, 2000, 2100 and 2200 can comprise a data field for storing the type of the annotation, where the data field also comprises a hyperlink field suitable to link the annotation to one or more than one digital media parameters. The digital media parameters are selected from the group comprising a digital media detail, a series of digital media files, or a single digital media file. Also, the data structures 1900, 2000, 2100 and 2200 can comprise actual digital media data, a storage location of the digital media data, or both the actual digital media data and the storage location of the digital media data. Further, the data structures 1900, 2000, 2100 and 2200 can comprise a marker to indicate the exclusion of the digital media from the NMO output. Finally, the data structures 1900, 2000, 2100 and 2200 can comprise a marker to indicate whether or not the digital media will be printed at a larger size in the NMO output. The data structures 1900, 2000, 2100 and 2200 are stored a second time when the user triggers the system to output the NMO environment.

Figure 23:
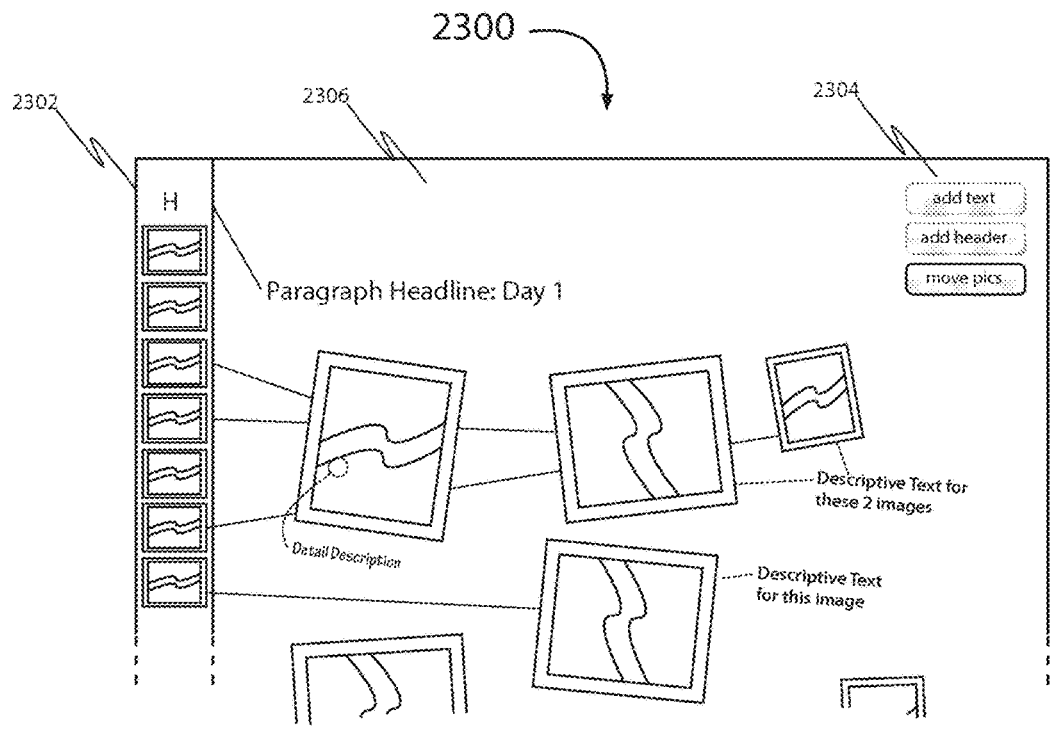
FIG. 23 is a diagram of a narrational media organizing system for transforming digital media into a personal, memorable story with minimal user input according to another embodiment of the present invention.

Referring now to FIG. 23, there is shown a diagram of a narrational media organizing system 2300 for transforming digital media into a personal, memorable story with minimal user input according to another embodiment of the present invention. In this embodiment an alternative NMO user interface is shown that is based upon the same principles of hiding, commenting and headlining, with a different interaction style. Here, there is provided a bar 2302 to the side of the user interface 2304 comprising a stream of graphical representations of digital media can be shown. The user can then drag one or more than one of the graphical representations of digital media to the NMO environment 2306 and place them in any order. Hiding of digital media in this embodiment is done by not adding the digital media to the NMO environment or by dragging the digital media back to the side bar 2302. Descriptions can be freely placed between digital media, but in some embodiments the software can require the user to associate comments with digital media, digital media details, or an unnumbered set of following digital media. The main feature of NMO, the automated generation of other outputs such as books, blogs, etc, can still easily be done with this user interface variation. Headlines are created in a way that they can be associated with breaks between the digital media blocks. Comments are created in a way that they are assigned with between-digital media-or-media-space, with digital media details, with single digital media etc. A timeline, such as from top to bottom, is maintained throughout the story then used as means for determining the sequence of data in the creation of material (in FIG. 23, this could be the y-axis). Additionally, a data structure 2308 that can store the NMO environment can be an XML-like code that is self explaining, including coordinates for digital media, comment, styles, etc.

Figures 23, 24:
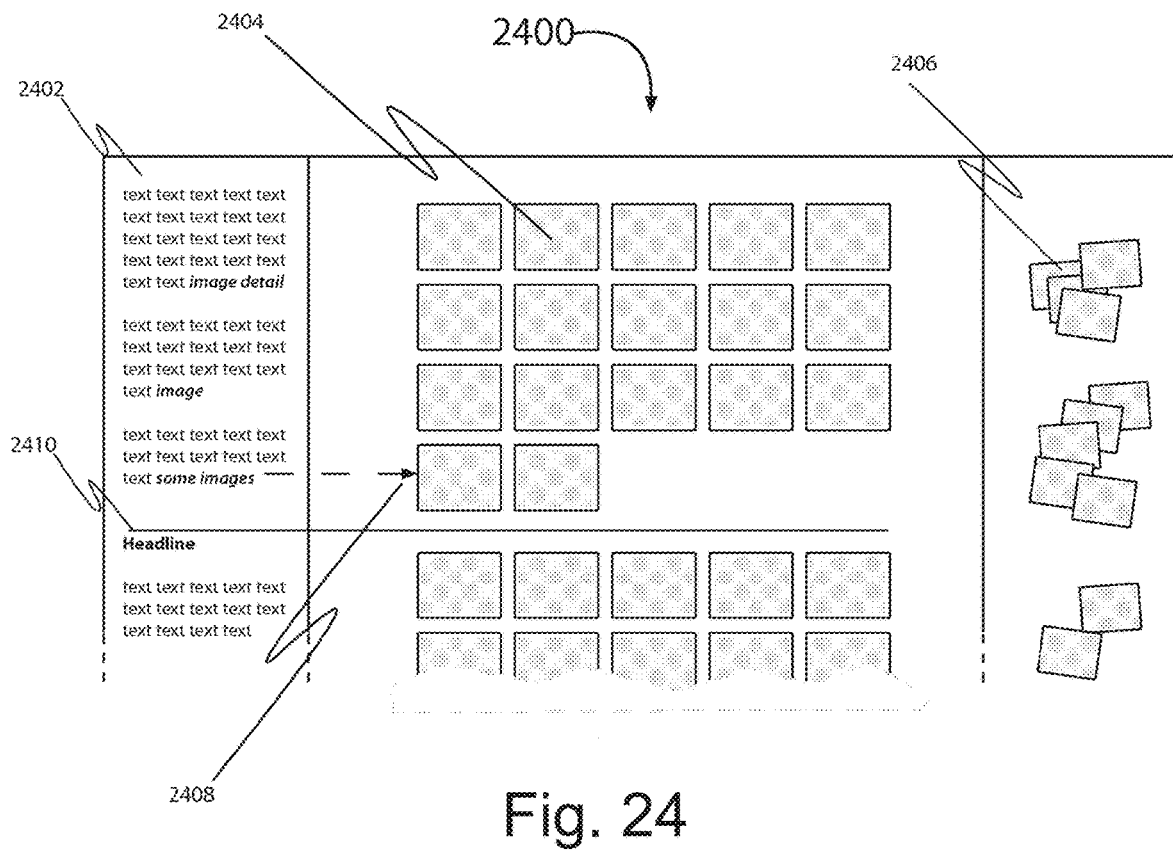
FIG. 24 is a diagram of a narrational media organizing system for transforming digital media into a personal, memorable story with minimal user input according to another embodiment of the present invention.

Referring now to FIG. 24, there is shown a diagram of a narrational media organizing system 2400 for transforming digital media into a personal, memorable story with minimal user input according to another embodiment of the present invention. As can be seen, the story can be told on the side of the digital media collection 2402, while keywords, such as, for example, "this digital media detail", "this digital media", "these digital media", "about here", "this duck", "these buildings", "these people" can be linked to the digital media 2404. The hiding of digital media can take place in any manner previously described above, or the unused digital media can be dragged to the side 2406 as to not distract from the story. Optionally, the excluded digital media 2406 can be automatically shrunk. The links 2408 can have different types, correlating to the comment types 1-5 disclosed earlier, allowing for the automatic creation of story outputs. A headline 2410 in this embodiment can graphically mark a separator between two blocks of digital media 2404.

Referring now to FIG. 25, there is shown a diagram of a slideshow 2500 output from the systems of FIG. 1, FIG. 3, FIG. 23 or FIG. 24. As can be seen a slideshow 2500 can be produced out of an NMO photo or media story. A headline 2502 could be presented on a separate slide, possible supported by a background or a GPS supported map. The digital media 2504 can stand by itself, or it can be accompanied by a comment, particularly if it is a single-digital media-comment. An in-between-type of comment can stand on a separate page (not shown), or it can appear between digital media during a slow slide from one digital media to the next. A digital media detail can be displayed with a line pointing from the comment to the digital media detail. Obviously, "hidden" or "shrunken" digital media will not be included.

Referring now to FIG. 26, there is shown a diagram of a printed picture output 2400 from the systems of FIG. 1, FIG. 3, FIG. 23 or FIG. 24. The digital media that the user has flagged as favorites (see the "heart" icon 1502) will be printed normally 2602 as it is already done today in almost all print services and as it is known from 35 mm print shops. In addition the user can be presented, at the time of ordering, with the option (checkbox, button) to additionally print the remaining story components 2604, it is those digital media that were not "hearted" 1502 and additional comments of types 1-5. The graphical display of this is simple as it simply requires the graphical display of the story with the exclusion of the favorite, heart-ed digital media. In another embodiment, images flagged for larger print can also be included as small images on the narrational pages as [2604], leading to more used print surface, but also leaving the story on said pages complete.

Figure 27:
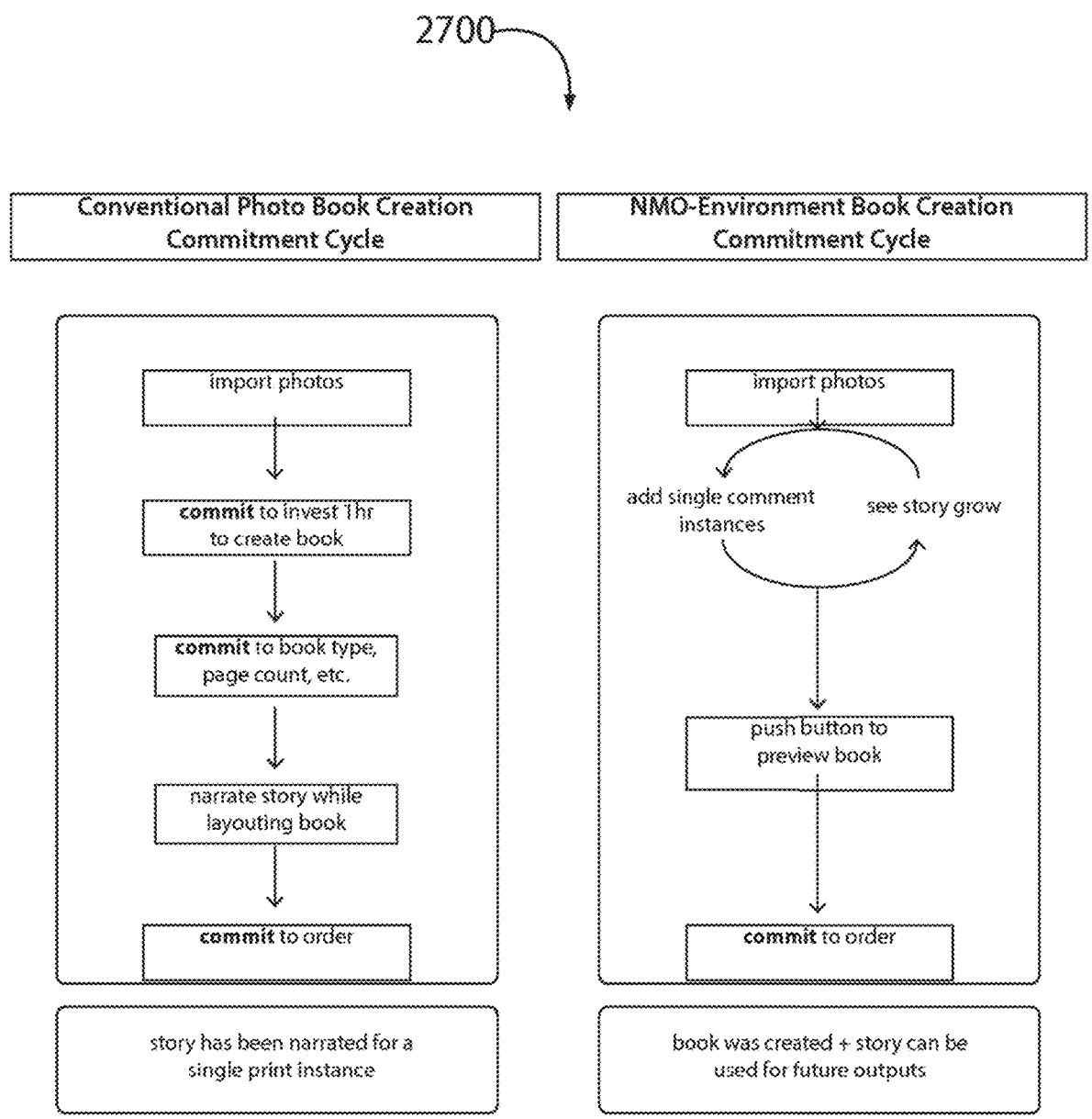
FIG. 27 is a diagram comparing the systems of FIG. 1, FIG. 3, FIG. 23 or FIG. 24.

Referring now to FIG. 27, there is shown a diagram comparing 2700 the systems of FIG. 1, FIG. 3, FIG. 23 or FIG. 24. As can be seen from the user's perspective, the benefits of the NMO systems previously presented for story-telling and book-creation or other output creation are far easier than conventionally available. As the comparison 2700 illustrates, the huge benefit is that no commitments need to be made, the flow of creation adapts to the flow of human narration, and the output (a book, in this example) is a natural by-product of this, whereas the path from digital media/media collection to output is in traditional environments much more cumbersome.

One of the highlights of the NMO environment concept is that it is able to work across multiple organizations, viewing and storing environments. This means that although the NMO environment can be used within the digital media organizing and commenting window (such as a MacOS digital media folder window or a Windows digital media folder window or the Adobe Photoshop Bridge window or the like), it starts to come in even more helpful when the digital media are spread across multiple environments, particularly output environments, as described below.

Using currently available tools, when a digital media folder/collection has been fully tagged, commented and rated, creating an online photo blog or a slideshow DVD or a printed book is made easier by being able to search for all "good" digital media or by being able to search for all "birthday" digital media. However, it is still an enormous amount of work to then create a slideshow, a blog or a photo book.

If the user has a commented folder with NMO the user can easily click a button and the software has all the data available to make a photo book or a photo blog or a video/slideshow that is perfectly structured. The digital media can be either printed and/or used the way they are, or refined by the user, such as, for example, by deleting digital media or deleting comments that don't fit well in the slideshow, photo book or blog, or by making single digital media very large, such as a full-page digital media in a photo book.

Using NMO the user has three options to refine the output digital media collection:

Option 1: The user can preview the output environment (such as a blog preview) and, if the user does not like the amount of digital media displayed (remember that shrunken digital media will be excluded) or the comments made or the structure the user has created, the user can go back to the normal NMO environment and refine his commenting.

Option 2: The user can refine his edits and the like within the output environment or the output environment preview (such as the preview of a photo book), while these comments to not affect the original NMO comments.

Option 3: The user can refine his edits and the like within the output environment or the output environment preview and have these comments stored cross-used in the original NMO environment, so that while refining the slideshow, the photo book or the preview, the user can simultaneously refine the original NMO data.

Allowing the user to select between option 2 or option 3 can be done by requesting a decision via a dialog box. It is also possible that the user cam be asked every single time the user adds a comment in an output environment whether this is supposed to be used in the main NMO data. The user is free to focus on the best structure and comments for the output environment. For example, adding a comment in a photo book can be mirrored in the main NMO environment, while in other cases the user may want to exclude, or shrink, a digital media file from a photo book, simply because it does not fit onto the page layout well that will not be mirrored in the NMO environment.

Figure 28:
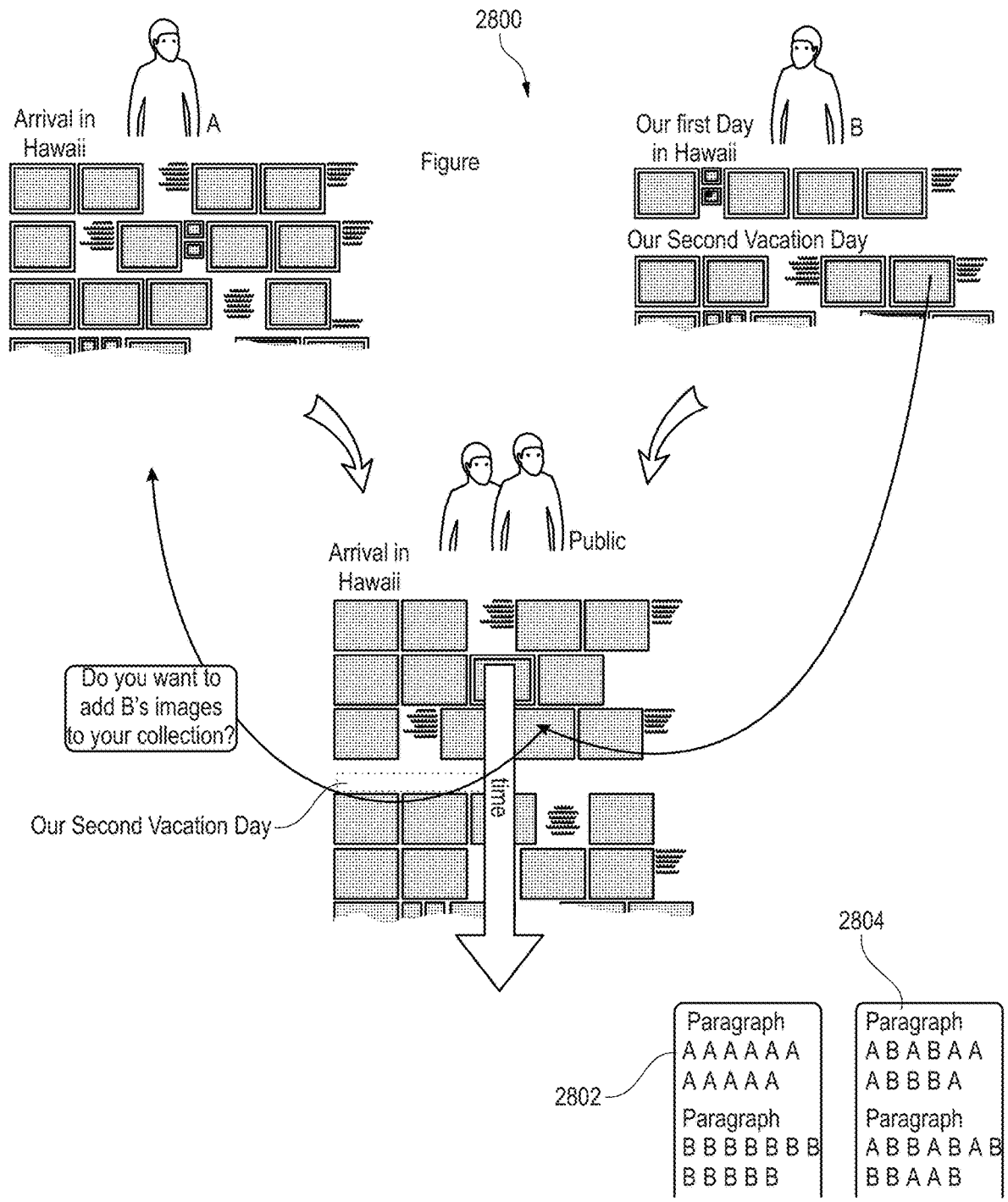
FIG. 28 is a diagram illustrating merging of two or more NMO stored NMO files.

Referring now to FIG. 28, there is shown a diagram illustrating merging 2800 of two or more NMO stored files. In this embodiment it is shown how easily two or more NMO-stories can be merged. Users A and B are using the NMO system 100 and they have digital media/media from the same event, such as, for example a wedding. The users can both create NMO stories that can be merged in a public display, such as a shared blog. Both users would need password access to this site. The merging happens by simply merging all paragraphs, comments and digital media by time. In this case, it is required that both cameras used by users A and B are set up with the correct internal time for this and that the digital media be time stamped. Merging can take place paragraph by paragraph 2802, or digital media by digital media 2804. Once the merging 2800 has taken place, one user can log in and receive select digital media from the other user's contribution to the blog. Optionally all the combined digital media can be imported leaving the user's original story intact. The system 100 can exclude the user's own digital media. Note also that "hidden" or "minimized" digital media are never uploaded to the blog/sharing site, but can be shared between A and B. In addition to contributing users with special access to the site, guest users can be allowed to view the site but not merge additional digital media to the story. The contributing users can be able to add or remove comments/digital media/headlines. Alternatively, the NMO environment can be configured to allow anyone to add to the story.

An illustrative example would be a wedding where there are multiple cameras and multiple stories that can create a more memorable and personal wedding album for both the guests and the happy couple.

Once the user has created several NMO digital media 'stories', the user will feel strongly rewarded for the relatively little effort put into the system via the relatively rewarding outcome. Due to the ease of creating stories, the user will continue to create NMO stories of holidays/ experiences/travels/parties that lie in the past and that are only scarcely supported by digital media material. In that case, the user can still create an NMO story supported by "snippets" and "snipped placeholders".

Imagine a holiday where the user has only few digital media, such as scans from four digital media hanging in his apartment—it is significantly less material then one has when freshly returning from a holiday where a digital camera was used. In that case the user would start with the four digital media and create two paragraphs out of these, using type 2 or type 4 comments on each of the four digital media and also using a relatively large number of type 1 comments to narratively capture elements of the event that aren't reflected by photographs.

In addition to that still incompletely narrated story, the user can use "snippets" and "snipped placeholders". In the current example, the user would choose a menu item or button labeled "insert snippet placeholder". When that is done, a snippet placeholder is inserted at the location of the NMO cursor. In one embodiment, the snipped placeholder can comprise a pop-up menu or it can be right-clickable or the like, so that multiple options are offered for turning the snippet placeholder into an actual snipped. A snippet can be for example: a GPS position; a website; a person's contact data; a photo of a souvenir; and a friend's digital media among other items.

If the snipped placeholder is connected into a snippet, the user would then see a digital media-sized graphic in the NMO folder displaying information of the snippet, such as a person's photo, a web link, a photo of a souvenir, and the like.

Examples for turning snippet placeholders into snippets comprise:

the user clicking on a snippet and is then presented, by the software, a tool where the user can choose a GPS position or, using an application like Google Earth, a picture of a house, building or a location that relates to the story. The user clicks on a snippet and is then prompted by the computer to hold a souvenir related to the story (an entry ticket for a concert, a physical souvenir from a story, such as a seashell, or a postcard, a scar, a piece of clothing, a dent in the car, or any object that was part of the story) in front of a camera built into the computer or otherwise connected or connectable to the computer. Then the software will integrate the digital media of the object into the NMO story.

In another embodiment, there can be add on modules to the NMO environment to perform specific tasks. For example, a module where the user can search for a person's contact data, that will then be included in the story; a module where the user can make a drawing of an element of the story to be told; and a module where the user can find a web site or a website's contents (story, digital media, link collection, video) to be included into the system, either via a link (to prevent copyright infringement) or as actual data (to prevent dependency on an external server).

People typically have all their digital media at one location (home, hard drive, collection of memory cards), or at least, they strive to do so, and they typically like to publish a subset of these digital media online. A third component is a long-lasting storage for digital media. A way that some companies strive for is to have user to store all digital media online at a certain location (cloud computing) and allow the users to publish some of these. Then, the promise is often made to users that these digital media there are safe for the next many decades. While this can with certain companies, such as Adobe or other multi-million dollar companies, be the case, it is transparent to the user that many companies will go out of business and the user can loose his digital media.

In one embodiment, an output/service/backup model is provided as described herein. In a private mode, the user can edit his digital media, including "shrinking" digital media to get them out of the way without deleting them. With a "sync" or "publish" or "print" or "create blog" etc. button, the user can then create the public counterpart of the NMO'ed digital media collection. In one embodiment, a preview is displayed to the user so that the user is assured that no wrong/unwanted digital media will be published.

In another embodiment, the user can, whenever the user outputs digital media form the private NMO environment to a public output environment (online blog, online photo collection, printed calendar, printed photo book, other merchandise) the user is provided an output that is accompanied by a multiple back-up. This way the user can also have a printed version of a book showing all of the good (not shrunken) digital media, while from that printed hardcopy the user can reconstruct either a further printed version of the same book (or, of course, poster, calendar, or other merchandise), or the user can also reconstruct the entire event, including even the shrunken digital media.

The back-up can comprise: a DVD with all digital media; a memory card/stick with all digital media; a code number for logging onto an online database to retrieve digital media later; an address and code word for contacting a service to retrieve digital media much later; indications/directions on a method on how to retrieve digital media later via a service and a proof of identity, such as a passport, an RFID chip embedded into the book cover that has an online address and other information necessary to retrieve digital media later; and adhesive stickers with some or all of the above information/RFID chip that the user can attach to some of his furniture, his wallet, his passport, or anything the user is unlikely to lose over decades; or a combination of the above. This is depicted in [3300].

The user can use the output services to generate an output the user trusts (a printed book and a DVD for instance), and that way the user is gently guided to also use the online digital media database as a safe backup, since it is not his only backup, but the most convenient one.

In another embodiment, a snippet placeholder is converted into a snippet by publishing a story containing snippet placeholders online and then asking friends (using a module that sends out emails or messages) to fill in data for the snippet placeholders. The user can publish an incomplete story and ask his friends that have participated in the event/vacation/party/wedding and the like to fill in missing data. Of course, the friends can be allowed to fill in digital media, snippet placeholders, or text comments, if the main author of the NMO story permits.

The NMO software can display to the user a rewarding feedback by showing him how much life the user has "told" in terms of the NMO experience. In one embodiment there is provided an algorithm that breaks this down into:
  words narrated;
  photos commented (or total in NMO'ed folders or paragraphs);
  days covered; and
  number of different years containing NMO'ed digital media;
This would motivate the user to continue to come back to comment the user's digital media collections.

In another embodiment, if the user telling the story feels that the user's material is has incomplete, the user can connect to a second person's digital media collection and incorporate the second person's digital media into the user's story. This works best if both digital media collections were taken at the same place, in the same place, and with both correctly set-up internal clocks in the cameras. In this case the software can automatically fill in all digital media of the second person into the incomplete story of the user with the incomplete story. Preferably if this is done by (a) marking all digital media of the second person, such as with a differently colored frame or tag, and by (b) displaying all digital media of the second person as "shrunken" digital media (see above) so that the user can un-shrink these, but all digital media not touched by the user won't become a part of the story unless otherwise determined by the user. This allows all digital media of the second person to be added to the story of the user, while the user still has control over the digital media to actually include. This embodiment also works for professionals that need to acquire digital images from a commercial archive. With the proper permissions, and payment, the professional can incorporate commercial stock photos into a story for a presentation or other event.

Figure 29:
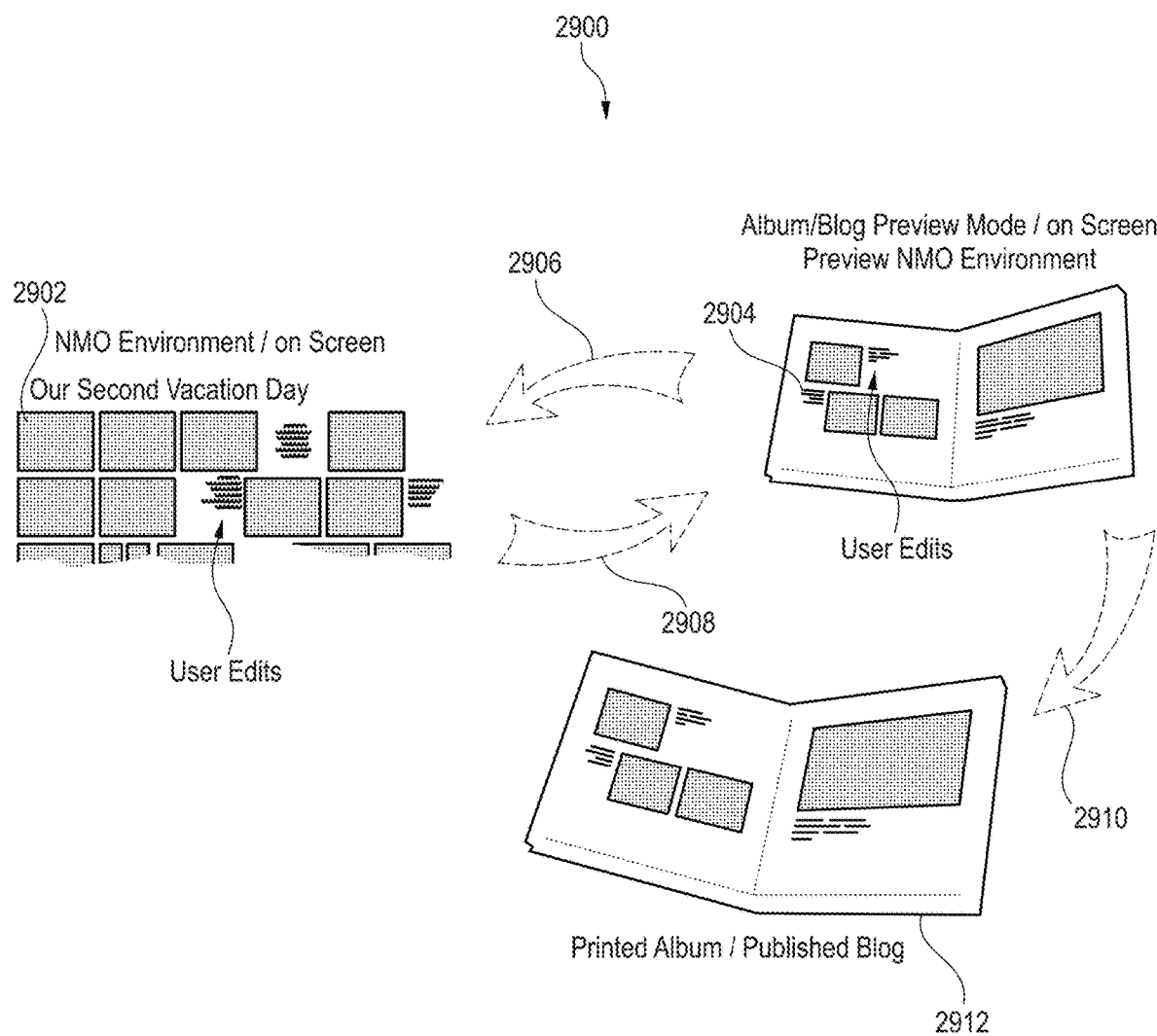
FIG. 29 is a diagram illustrating an editing cycle according to another embodiment of the present invention.

Referring now to FIG. 29, there is shown a diagram illustrating an editing cycle 2900 according to another embodiment of the present invention. Here, the user can edit his NMO in the main screen 2902 in no particular layout, then preview a book on his screen or remotely 2904. Editing is also possible including NMO related edits (hiding of digital media, adding or changing texts or headlines) as well as non-NMO-related edits (book layout specifics). The NMO related edits in 2094 do modify the same data as in the NMO default environment 2902, indicated by the arrows 2906 and 2908. When the editing is complete, the print process 2910 can begin, and the final result, a printed hardcopy 2912 in this instance, can be output.

Figure 30:
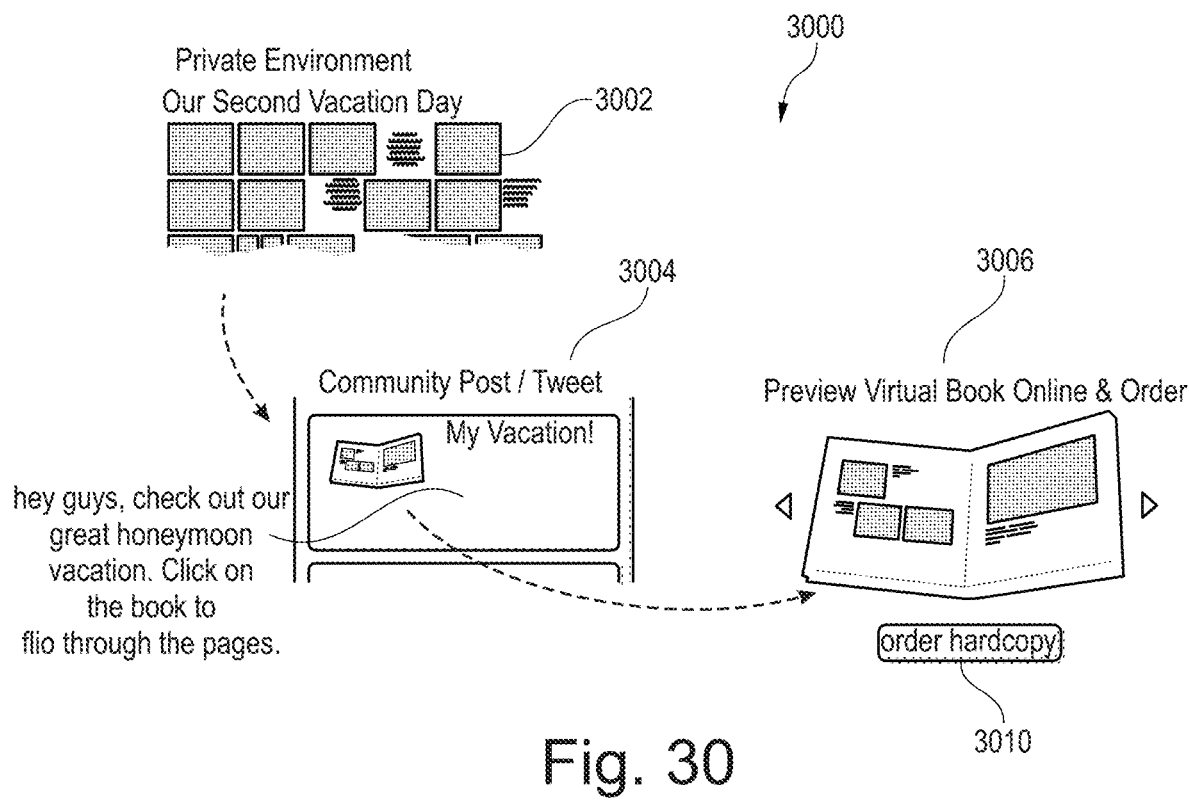
FIG. 30 is a diagram illustrating the creation of an NMO output using a community service.

Referring now to FIG. 30, there is shown a diagram illustrating the creation of an NMO output 3000 using a community service. A private NMO environment 3002 allows the user to narrate a story and to create, at the push of a button, an output such as a photo book, a series of prints, or other output formats. The NMO environment can also share the private NMO environment 3002 with an online community, such as, for example, Twitter or Facebook. The community post or tweet 3004 can comprise a preview and a link of the story, such as a book icon or the like, where readers of the tweet/post/blog entry can access a dedicated website 3006 featuring an actual preview of the book. This way the book creator can share the book for free, following his intent of narrating the story and making the story accessible. The people that were sent the tweet/post/blog entry can then also order a hardcopy of the photo story output themselves 3010, that makes getting the book either digitally or in printed from a lot easier for friends of the individual having created the photo story.

Examples of other output environments are online photo blogs, uploads to cell phone or PDA digital media collections, slide shows on DVD, slide shows as executable files, digital photo books including videos and audio, printed photo books, online collections, and the like.

Note that in an output environment that is not per se compatible with NMO, such as, let's say flickr.com, comments and paragraphs can still be added by including them in bitmaps that are exported with the digital media. For instance, a comment of type 1 can be exported as a single digital media containing text on white or, if supported, transparent background, while a type 4 comment can be exported as a digital media with a little target circle plus a second digital media containing the comment. Paragraph headlines can be exported as horizontally stretched digital media containing text.

Figure 31:
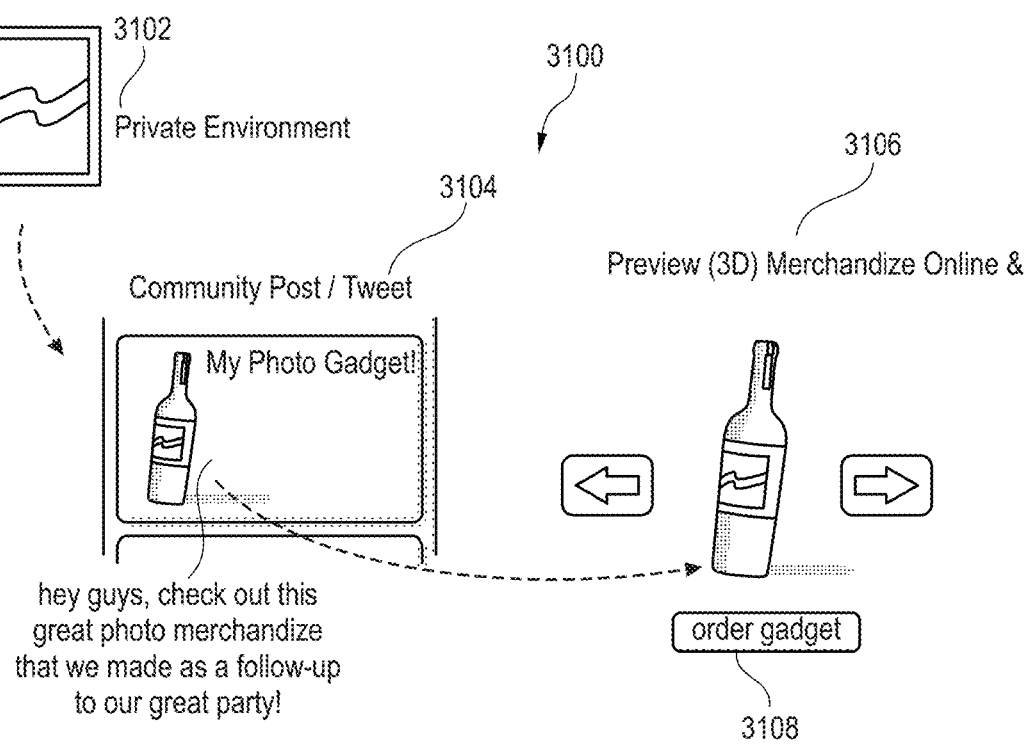
FIG. 31 is a diagram illustrating the creation of merchandise using an NMO output.

Referring now to FIG. 31, there is shown a diagram illustrating the creation of merchandise 3100 using an NMO output. A user can edit/filter/prepare digital media from his private environment 3102 and create a piece of photo merchandise with the digital media. This can be a mouse pad or a coffee mug, but it can also be a stronger piece of merchandise that can amplify the message that the picture is sending in conjunction with the piece of merchandise. For example, a wedding photo on a French castle can be even more interesting to share if it is part of a label on a wine bottle. The user can share an icon of his photo merchandise in a community blog/post/tweet 3104 and allow customers to access the photo merchandise through a link to a dedicated website 3106 where a full resolution, preview (rotatable, scalable, modifiable) image of the merchandise can be seen. Friends or customers of the user can then purchase copies of the merchandise on their own 3108 without creating a hassle for the original user.

Figure 32:
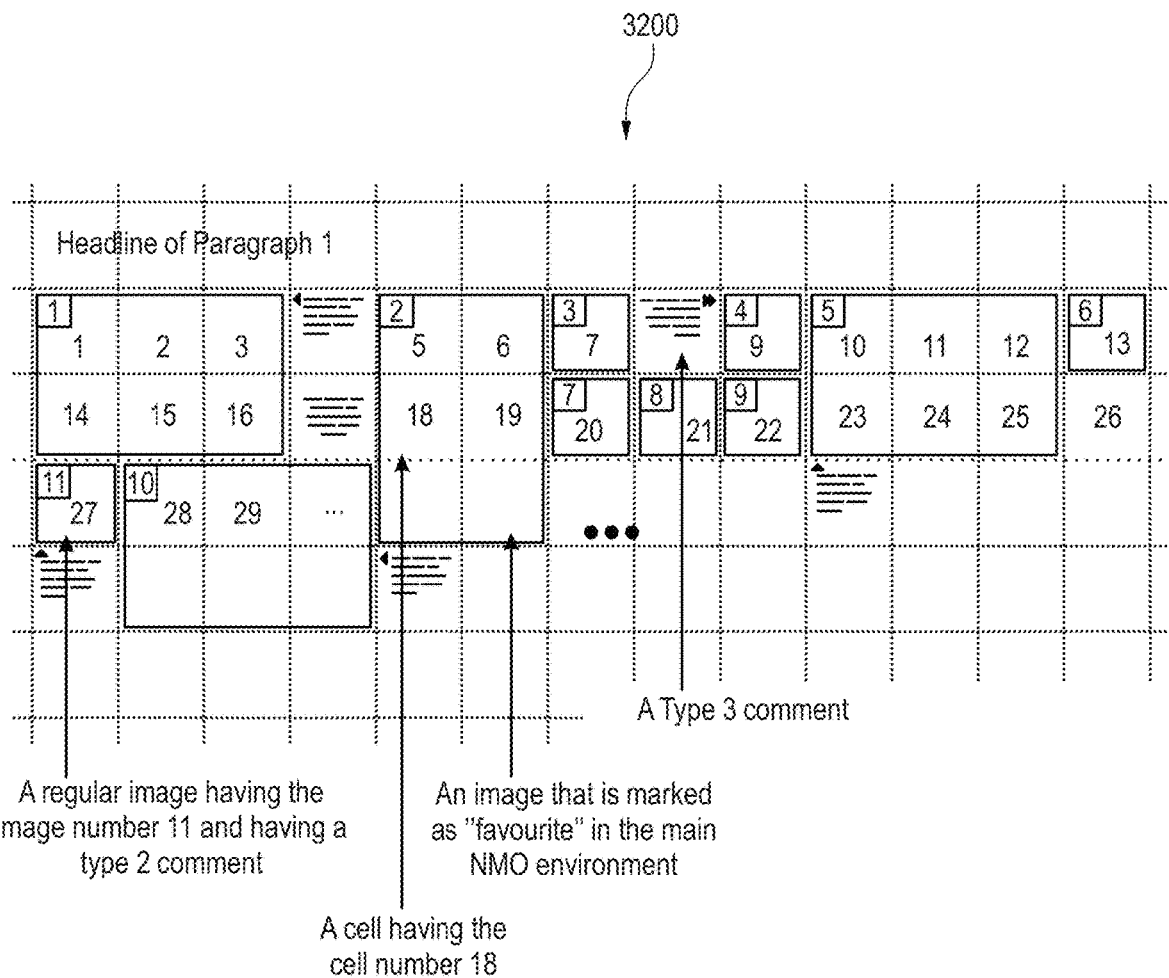
FIG. 32 is a diagram of a narrational media organizing system for transforming digital media into a personal, memorable story with minimal user input according to another embodiment of the present invention.

Referring now to FIG. 32, there is shown a diagram of a narrational media organizing system 3200 for transforming digital media into a personal, memorable story with minimal user input according to another embodiment of the present invention. The system 3200 comprises an algorithm for creating an NMO output, such as, for example, a book. If a favorite digital media (see heart icon 1502) is to be printed larger in the NMO output, the layout creation, by virtue of resizing all the digital media the same vertical height allows the NMO output instructions to place the digital media and comments next to one another, similar to a word processor. Text, paragraphs and headlines are similarly placed in the fashion of headlines in a word processor. However, if flagged digital media are expected to be printed larger, they can either be printed by themselves on a dedicated page in the book, or an optimizing algorithm as shown below in pseudo-code can be used.

```
//Algorithm for NMO (Screen, Book, blog) Display
Let I1...IN be the N images within an NMO Paragraph, then
be P.i(I) be the 1...i...M possible permutations of I.1...I.N
// not including shrinked images
for i = 1...M
    for j = 1...N
        place P.i(I)j at the free cell(s) with the lowest number...
        // Note: favorite images can extend over many cells.
        place the belonging comment to Pi(I)j at the free cell...
        ...with the lowest number.
    end j
    score.i for this permutation =
    ...sum for all cells of 1 / (cell number * assoc. image number)
end i
select permutation with score.i (1...i...M) = maximal.
//Acceleration for large paragraphs:
//For large paragraphs, it will be computationally too time-consuming to
go
//through all permutations. In that case, we recommend to pict only the
first X (for
//instance X = 12 images and apply abovementioned algorithm to them,
then pick
//all X images or less, such as the first 6, and then proceed with the
remaining, un-//layouted data.
// Note: FIG. 32 supports this algorithm by showing light gray numbers
// for cell numbers and dark numbers for image numbers.
```

Referring now to FIG. 33, there is shown a diagram of a printed output 3300 from the systems of FIG. 1, FIG. 3, FIG. 23, FIG. 24 or FIG. 32. The printed output 3300 shows one embodiment of the backup capabilities of a printed piece of photo merchandise, as described in detail above.

FIG. 34 is a diagram of a user interaction where a user can emphasize 3400 a particular image by resizing the image. The user can flag selected digital media to make it stand out. The user has three options for priorities of digital media, the user can: (a) minimize or shrink a digital media to get it out of the way in normal NMO view (as described earlier); (b) the user can leave the digital media normal, then it will be displayed at normal size, or (c) the user can "star" or "flag" a digital media to define this as a special digital media. In the latter case, the digital media can be displayed at larger size in an output environment, or, if the digital media sequence allows for this, the digital media can be displayed at a full page in a photo book.

In one embodiment, the user can enlarge 3400 a selected digital media in the NMO environment by dragging one corner of the graphical representation to the desired size. Due to the grid format of the NMO environment, the enlarged graphical representation will automatically be sized to fit to the closest grid within the grid structure when the user releases the graphical representation.

In another embodiment the user can emphasize a particular image by dragging its size up. Unlike today's methods, this can be done directly inside the NMO environment, triggering the one or more than one processor, for instance by re-running the algorithm 3200, to re-render the image collection, so that other images get sorted around the now-bigger image. This can happen accordingly in reverse direction when the image gets downsized. The upsizing can serve as an indication that the user wants this image to be displayed larger, or, in addition or alternatively, it can also serve as an indication that this image is a favorite.

Referring now to FIG. 35, there is shown a diagram 3502 and a flowchart 3504 of an algorithm for flagging a single digital media in the NMO environment according to one embodiment of the present invention.

The algorithm basically uses a grid pattern to place favorite digital media in a larger fashion than the other digital media, while still maintaining the narrational sequence. The algorithm first begins by determining a maximal page or screen width $W_{max}$ and determining a current position P (not shown) at the top left of the area to be filled. If the next element to be placed is a headline, the headline is placed at position P and P is moved down by the height of the headline. If the next element is digital media, media thumbnail or a comment, it is placed at position P and P is moved to the right by the width of the object (w.x)+a. If $P>W_{max}$, P is moved down by the height of the largest object in the row+B. These steps are repeated for all subsequent objects in the NMO data structure.

The flowchart 3504 of the algorithm shows the steps to render a collection of digital media in an NMO system 3502.

Variables x,y, W, h are shown in both the system 3502 and correspondingly in the flowchart 3504.

Figure 36:
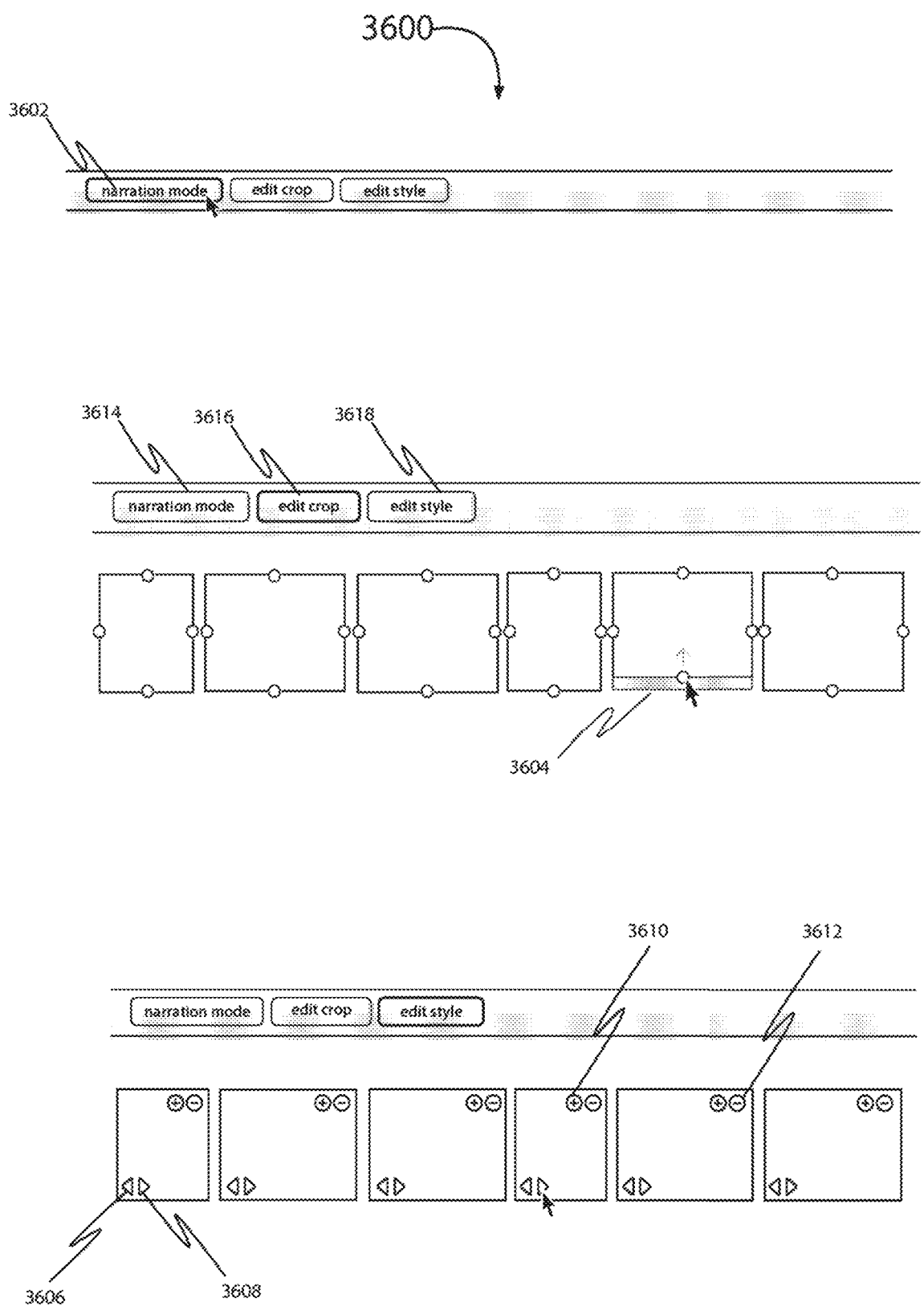
FIG. 36 is a diagram of a toolbar and menu system useful in the system of FIG. 1.

FIG. 36 is a diagram of a toolbar and menu system 3602 useful in the system of FIG. 1. In another embodiment, the NMO system 100 can present the user with a menu that the user can set up the image collection editing mode to image crop 3604 and also rotate. Performing a crop 3604 would trigger a behavior and re-arrangement of the digital media. The user can edit the style of an image using simple buttons 3614, 3616 and 3618. In this embodiment the user can use a simplified method of quickly editing image styles of the digital media. The buttons 3614, 3616 and 3618 can be used to quickly navigate through different styles of an effect, such as different types of BW conversion or different types of a color tint effect of different types of a contrast effect. Also the button 3614, 3616 and 3618 can be used to smoothly nudge the main parameter of an effect up and down, this can for instance be the brightness used during BW conversion or the strength of a color tint effete.

In another embodiment the buttons 3606, 3608, 3610 and 3612 can be superimposed over the digital media.

Figure 37:
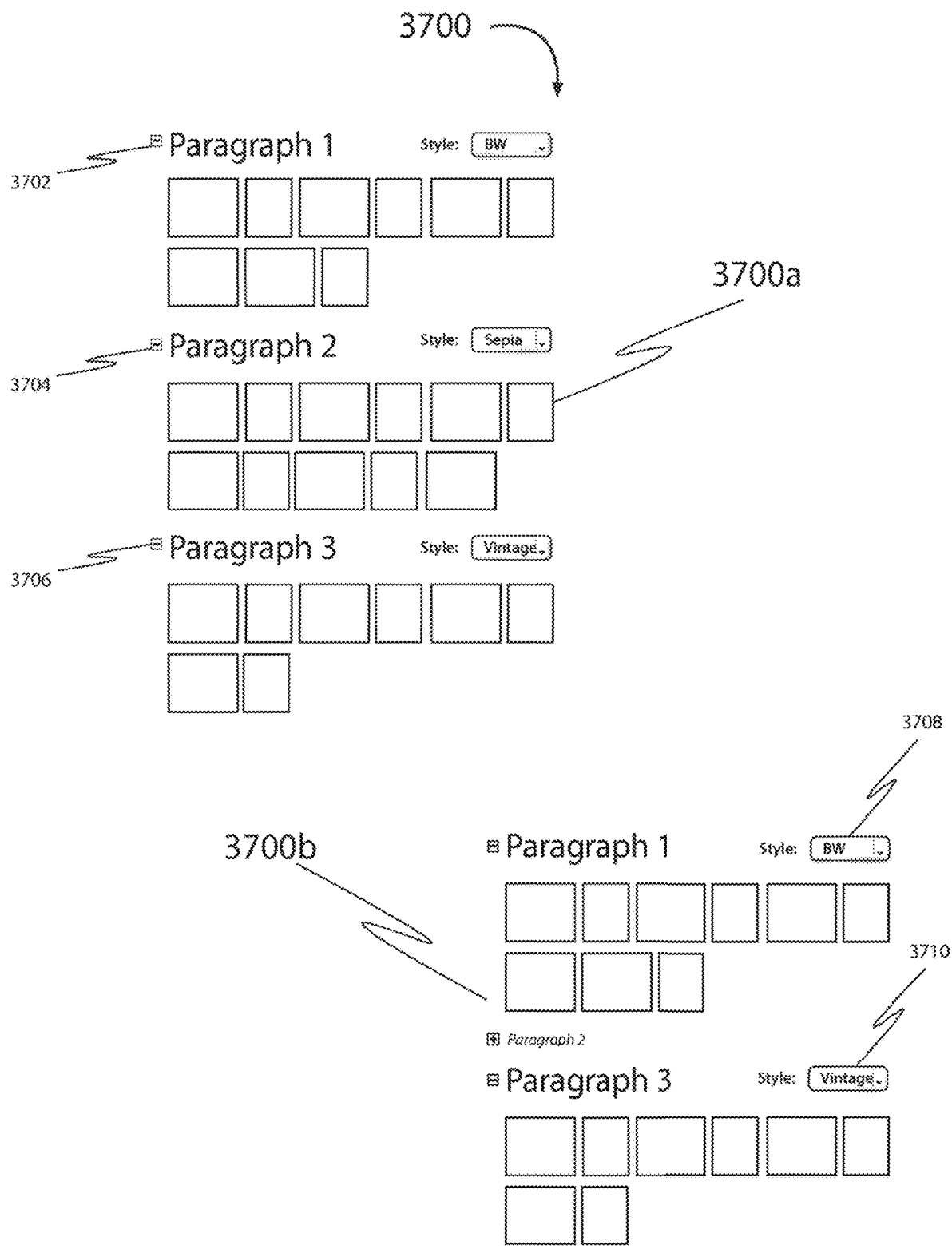
FIG. 37 is a diagram of digital media style selections useful in the system of FIG. 1.

FIG. 37 is a diagram of digital media style selections 3700 useful in the system of FIG. 1. In this embodiment, the NMO environment is also configured to exclude/re-include entire paragraphs within the NMO environment. An included paragraph 3700*a* and an exclude paragraph 3700*b* pictorially show both states. By selecting an exclude icon 3702, 3704 and 3706 will trigger the digital media of the paragraph to not be displayed within the NMO environment as well as not to be included in any output. Additionally, style selections 3708 and 3710 can also be applied per paragraph.

Figure 38:
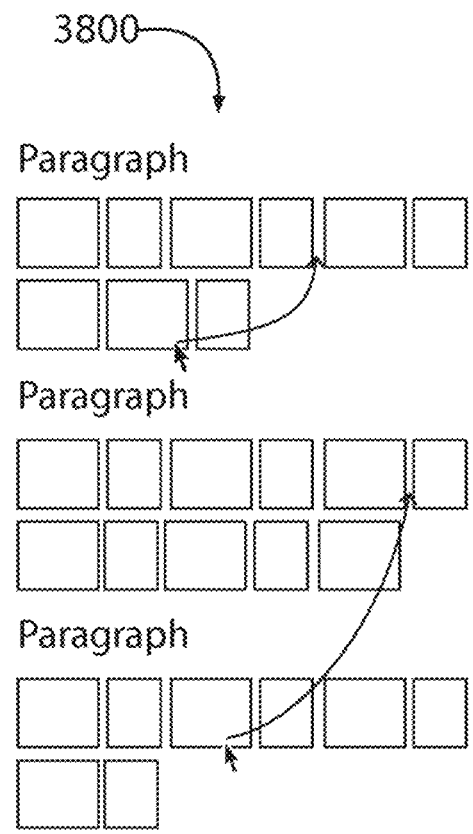
FIG. 38 is a diagram of digital media arrangements that a user can select.

FIG. 38 is a diagram of digital media arrangements 3800 that a user can select. In this embodiment, the digital media is arranged in a user-desired sequence, both within a paragraph as well as between paragraphs. The data structures shown in FIGS. 19 through 22 are suitable to support this feature as will be obvious to those skilled in the art with reference to this disclosure, where the data structure in FIG. 20 can be a preferred data structure for this purpose. Additionally, moved images can receive a flag in the internal storage of the NMO environment so that the non-selected digital media can be identified and a timeline of the event can still be used, as a timeline can be reconstructed from the unflagged digital media.

Figure 39:
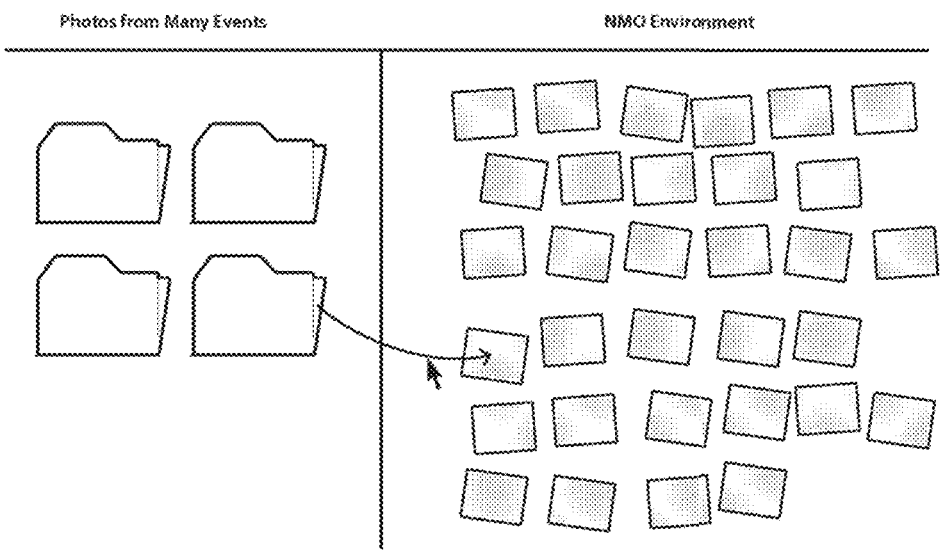
FIG. 39 is a diagram illustrating a method of randomly selecting digital media to be arranged in the NMO environment.

FIG. 39 is a diagram illustrating a method of randomly selecting digital media to be arranged in the NMO environment. In this embodiment, the NMO environment provides a method so that the user can also take random selections of various photo events and arrange them into a new collection, where the user can then apply the NMO features previously described to the newly created collection. As a first timely sequence the time of taking the picture can be used, or the moment where the user has added the image to the digital media collection. The re-ordering shown in FIG. 38 can also be performed in a collection as shown here.

Figure 40:
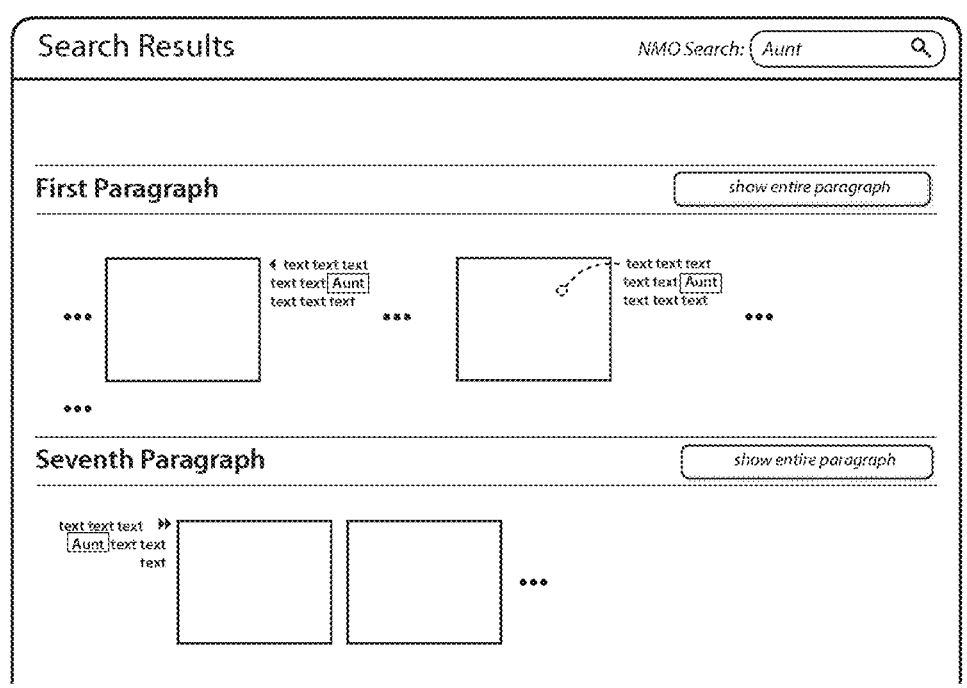
FIG. 40 is a diagram of a search result display using search capabilities useful in the system of FIG. 1.

Referring now to FIG. 40, there is shown a diagram of a search result display 4000 using search capabilities useful in the system of FIG. 1. As can be seen, the search result display 4000 shows a possible embodiment of a search result display, using the search functionality described herein. For example, the user has searched for "Aunt", which is a word found in three different annotations within the current NMO environment, in this example, the first paragraph and the seventh paragraph. The system 100 would only display the paragraphs that contain annotations with the word similar or resembling the word the user has searched for, while only the digital media related to the annotation are shown. If an annotation is for a single digital media file, the file or a graphical representation of the file is shown. If the annotation is for a digital media detail, the entire file is shown. If the annotation is for a series of images, two or more of the digital media files can be shown unless the annotation discloses how many digital media files are referred to by the annotation. If a paragraph contains the search term, all images in the paragraph are being shown (not illustrated here). All digital media not shown and all paragraphs not shown are substituted with empty space or three dots. The user can expand a paragraph with relevant search results so that then all digital media within that paragraph are shown, so that the user can find more relevant digital media within the context.

In one embodiment, a textual digital media search can be performed within the NMO workspace. The NMO search will exceed the usability of other text searches due to the ease of entering comments. Looking briefly at other current text search concepts, the user needs to tag individual digital media first or comment individual digital media. Rating digital media is also possible. This has several downsides. For example, most of this is done with non-natural-language icons and keywords. These are not fun to use for digital media commenting, as continuously decisions on the optimal category or keyword or flag need to be made, second, our experiences are that keywords are actually harder to remember ("did I tag granny's birthday with 'granny', or just with 'Margaret'?"). This means that it is not easy to retrieve relevant digital media using given rating or keywords. Another, much bigger downside is, that the user experience of tagging, rating and key wording is non-rewarding, and only few people appear to voluntarily organize an entire digital media folder more than once (with the exception of professional stock art photographers).

The search functionality in the NMO environment is more complete because: (1 the experience of NMO-ing a folder is very rewarding (the users sees the structure of their digital media grow while the work in the environment, and the experience itself is very natural, like telling a story to a friend. Also, because all comments are made in natural language, it is easy for the user to enter "here we are on granny Margaret's birthday party", that is, mentally, a lot easier to do than making micro-decisions on the keywords "Granny" "Margaret" "Birthday" and "Party" as is the case with current programs. Last, naturally written comments are more memorable, as experience with NMO appears to indicate. The user experience is also enhanced because not every digital media file needs to be categorized, tagged and keywords added. In the NMO environment the user can enter one annotation for one or more than one digital media file, thereby annotating all of them. For example, the user can enter five annotates related to a collection of digital media/graphical representations and that is sufficient to make an entire collection of hundreds of digital media/graphical representations (a) tell a story and (b) be sufficiently searchable. This is significantly less work than commenting, rating and tagging individual digital media as is the current practice.

If a folder were fully and correctly tagged and key worded, then searching for all digital media with "birthday" would be very straightforward. However, it is understood that such an ideal world does not exist. NMO searching is less straightforward, since full per-digital media comments are not required from the user. However, it is still conveniently possible. The user can search for any words the user assumes the user can have used somewhere in commenting. Matching digital media can then be determined as follows:

A digital media instance has a high matching value of a type 2, 4 or 5 comment is associated with the digital media with matching search contents.

A digital media instance has a high matching value if the digital media or one of the two preceding digital media has a type 3 comment.

A digital media instance has a low matching value if one of the five preceding digital media has a type 3 comment.

A digital media instance has a low matching value if it belongs to a paragraph the title that has matching search words.

A digital media instance has a high matching value if it belongs to a paragraph the title that has matching search words and if any additional related comment of types 1, 2, 3 or 4 has matching search words.

To summarize, the benefit of searching a media instance in the NMO world is that not all digital media need to be tagged by the user, and still a large number can be found, as a digital media will be identified by a text search if there is a match: to the digital media itself; to a nearby in-between digital media comment; to a preceding type 3 digital media comment; to the paragraph description that a digital media belongs to.

In one embodiment, there are two methods of displaying search results, the one being simply listing the digital media by matching value as defined above, either by matching value or by time shot. The other method is to display the digital media depending on the type of related found comment. For example: for each matching comment of type 1, the comment can be displayed with the digital media to the left and the right. To further illustrate that this is an in-between-digital media comment, the preceding digital media could be faded out to its left, and the subsequent digital media could be faded out to its right.

For each matching comment of type 2, the digital media could be displayed with its comment next to it.

For each matching comment of type 3, the plurality of digital media (the number of digital media returned will depend on the amount of correct keywords) can be displayed as a search result, possibly fading them graphically out to the right so that it is indicated that more digital media can follow.

For each matching comment of type 4, the digital media can be shown with the comment next to it and with the digital media detail highlighted, for instance with a circle.

If text in a headline is found, the entire paragraph can be displayed, and or the users convenience the digital media can be displayed a lot smaller, so that they don't weigh out the single occurrences of found digital media.

A further different method is to leave the entire digital media folder in its NMO display, and only fading out those digital media (and related comments) that aren't matched by the search, see abovementioned criteria. Additionally the text can be highlighted wherever the search was matched.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A computer-implemented method comprising:
   providing to a user digital media files as graphical representations of each of the digital media files in an arrangement along a timeline in a work area, wherein the graphical representations are in an original paragraph;
   receiving a gesture operated interaction from the user to create a new paragraph;
   creating the new paragraph;
   receiving a tap and hold gesture from the user to move a first graphical representation representative of a first digital media file of the digital media files from the original paragraph to the new paragraph;
   in response to the tap and hold gesture on the first graphical representation, moving the first graphical representation from the original paragraph to the new paragraph;
   receiving selection of a minimizing icon associated with the first graphical representation;
   in response to receiving the selection, replacing the first graphical representation with a smaller icon that is smaller than the first graphical representation; and
   responsive to receiving a search request from the user that includes selection of an option to exclude the digital media files represented with the smaller icon, conducting a search of the digital media files that excludes the first digital media file.

2. The method of claim 1, wherein the timeline is a grid and the graphical representations of the digital media files are arranged on the grid, the graphical representations of a first subset of the digital media files having a different size than the graphical representations of a second subset of the digital media files.

3. The method of claim 1, wherein a default setting of the search request is to include the digital media files represented with the smaller icon.

4. The method of claim 1, further comprising:
   receiving text input from the user that is positioned between the first graphical representation and a second graphical representation of the graphical representations; and
   responsive to the text input exceeding a threshold amount of text, moving the second graphical representation to the new paragraph.

5. The method of claim 4, further comprising: receiving, via an input device associated with the user, an annotation of the second graphical representation and a connection between the annotation and a detail within the second graphical representation; and displaying a connector line between the annotation and the second graphical representation.

6. The method of claim 5, further comprising applying the annotation from the user to the first graphical representation and the second graphical representation.

7. The method of claim 1, further comprising responsive to an amount of available storage on a user device falling below a threshold amount, providing a dialog to the user that suggests downsizing the first graphical representation and associating the first graphical representation with a lower resolution than an original resolution of the first graphical representation.

8. A non-transitory computer-readable medium with instructions stored thereon that, when executed by one or more computers, cause the one or more computers to perform operations, the operations comprising:
   providing to a user digital media files as graphical representations of each of the digital media files in an arrangement along a timeline in a work area, wherein the graphical representations are in an original paragraph;

receiving a gesture operated interaction from the user to create a new paragraph;

creating the new paragraph;

receiving a tap and hold gesture from the user to move a first graphical representation representative of a first digital media file of the digital media files from the original paragraph to the new paragraph;

in response to the tap and hold gesture on the first graphical representation, moving the first graphical representation from the original paragraph to the new paragraph;

receiving selection of a minimizing icon associated with the first graphical representation;

in response to receiving the selection, replacing the first graphical representation with a smaller icon that is smaller than the first graphical representation; and responsive to receiving a search request from the user that includes selection of an option to exclude the digital media files represented with the smaller icon, conducting a search of the digital media files that excludes the first digital media file.

9. The computer-readable medium of claim 8, wherein the timeline is a grid and the graphical representations of the digital media files are arranged on the grid, the graphical representations of a first subset of the digital media files having a different size than the graphical representations of a second subset of the digital media files.

10. The computer-readable medium of claim 9, wherein the operations further comprise displaying the graphical representations of the digital media files on the grid by:

determining a maximal page or screen width;

determining a current position of an area to be filled and moving the current position down by a height of a headline; and placing the first graphical representation of the graphical representations within the area to be filled.

11. The computer-readable medium of claim 8, wherein the operations further comprise:

receiving text input from the user that is positioned between the first graphical representation and a second graphical representation of the graphical representations; and responsive to the text input exceeding a threshold amount of text, moving the second graphical representation to the new paragraph.

12. The computer-readable medium of claim 11, wherein the operations further comprise: receiving, via an input device associated with the user, an annotation of the second graphical representation and a connection between the annotation and a detail within the second graphical representation; and displaying a connector line between the annotation and the second graphical representation.

13. The computer-readable medium of claim 12, further comprising applying the annotation from the user to the first graphical representation and the second graphical representation.

14. The computer-readable medium of claim 8, wherein the operations further comprise responsive to an amount of available storage on a user device falling below a threshold amount, providing a dialog to the user that suggests downsizing the first graphical representation and associating the first graphical representation with a lower resolution than an original resolution of the first graphical representation.

15. A system comprising:

one or more processors; and a memory that stores instructions that, when executed by the one or more processors cause the one or more processors to perform operations comprising:

providing to a user digital media files as graphical representations of each of the digital media files in an arrangement along a timeline in a work area, wherein the graphical representations are in an original paragraph;

receiving a gesture operated interaction from the user to create a new paragraph;

creating the new paragraph;

receiving a tap and hold gesture from the user to move a first graphical representation representative of a first digital media file of the digital media files from the original paragraph to the new paragraph;

in response to the tap and hold gesture on the first graphical representation, moving the first graphical representation from the original paragraph to the new paragraph;

receiving selection of a minimizing icon associated with the first graphical representation;

in response to receiving the selection, replacing the first graphical representation with a smaller icon that is smaller than the first graphical representation; and responsive to receiving a search request from the user that includes selection of an option to exclude the digital media files represented with the smaller icon, conducting a search of the digital media files that excludes the first digital media file.

16. The system of claim 15, wherein the timeline is a grid and the graphical representations of the digital media files are arranged on the grid, the graphical representations of a first subset of the digital media files having a different size than the graphical representations of a second subset of the digital media files.

17. The system of claim 16, wherein the operations further comprise displaying the graphical representations of the digital media files on the grid by: determining a maximal page or screen width; determining a current position of an area to be filled and moving the current position down by a height of a headline; and placing the first graphical representation of the graphical representations within the area to be filled.

18. The system of claim 15, wherein the operations further comprise:

receiving text input from the user that is positioned between the first graphical representation and a second graphical representation of the graphical representations; and responsive to the text input exceeding a threshold amount of text, moving the second graphical representation to the new paragraph.

19. The system of claim 18, wherein the operations further comprise: receiving, via an input device associated with the user, an annotation of the second graphical representation and a connection between the annotation and a detail within the second graphical representation; and displaying a connector line between the annotation and the second graphical representation.

20. The system of claim 19, wherein the operations further comprise responsive to an amount of available storage on a user device falling below a threshold amount, providing a dialog to the user that suggests downsizing the first graphical representation and associating the first graphical representation with a lower resolution than an original resolution of the first graphical representation.

\* \* \* \* \*